United States Patent
Iguchi et al.

(10) Patent No.: US 10,740,641 B2
(45) Date of Patent: Aug. 11, 2020

(54) IMAGE PROCESSING APPARATUS AND METHOD WITH SELECTION OF IMAGE INCLUDING FIRST AND SECOND OBJECTS MORE PREFERENTIALLY THAN IMAGE INCLUDING FIRST BUT NOT SECOND OBJECT

(71) Applicant: CANON KABUSHIKI KAISHA, Tokyo (JP)

(72) Inventors: Ryosuke Iguchi, Inagi (JP); Shinjiro Hori, Yokohama (JP); Hiroyasu Kunieda, Yokohama (JP); Masaaki Obayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 15/828,698

(22) Filed: Dec. 1, 2017

(65) Prior Publication Data
US 2018/0165538 A1  Jun. 14, 2018

(30) Foreign Application Priority Data

Dec. 9, 2016  (JP) .................. 2016-239782

(51) Int. Cl.
| | |
|---|---|
| *G06K 9/68* | (2006.01) |
| *G06K 9/32* | (2006.01) |
| *G06K 9/62* | (2006.01) |
| *G06T 7/00* | (2017.01) |
| *G06T 7/13* | (2017.01) |
| *G06T 7/136* | (2017.01) |

(Continued)

(52) U.S. Cl.
CPC ....... *G06K 9/3241* (2013.01); *G06K 9/00684* (2013.01); *G06K 9/6202* (2013.01); *G06K 9/72* (2013.01); *G06T 7/13* (2017.01); *G06T 7/136* (2017.01); *G06T 7/73* (2017.01); *G06T 7/97* (2017.01); *G06T 11/60* (2013.01); *G06T 7/11* (2017.01)

(58) Field of Classification Search
None
See application file for complete search history.

(56) References Cited

U.S. PATENT DOCUMENTS

| | | | |
|---|---|---|---|
| 5,731,849 A | * | 3/1998 | Kondo ............... H04N 5/23248 348/699 |
| 7,006,668 B2 | | 2/2006 | Iguchi et al. |

(Continued)

FOREIGN PATENT DOCUMENTS

JP  2007-058795 A  3/2007

OTHER PUBLICATIONS

Pere Obrador and Nathan Moroney—XP030081740—Automatic Image Selection by means of a Hierarchical Scalable Collection Representation, Issued Jan. 2009, SPIE-IS&T, vol. 7257, pp. 72570W-1 to 72570W-12. (Year: 2009).*

(Continued)

*Primary Examiner* — Feng Niu
(74) *Attorney, Agent, or Firm* — Venable LLP

(57) ABSTRACT

At least one apparatus recognizes a first object and a second object associated with the first object in a plurality of images, calculates a score for each of the plurality of images based on a result of the recognition of the first object and the second object, and selects an image concerning the first object from the plurality of images based on the score for each of the plurality of images.

15 Claims, 18 Drawing Sheets

(51) Int. Cl.
  *G06T 7/73* (2017.01)
  *G06K 9/00* (2006.01)
  *G06K 9/72* (2006.01)
  *G06T 11/60* (2006.01)
  *G06T 7/11* (2017.01)

(56) References Cited

U.S. PATENT DOCUMENTS

| | | | |
|---|---|---|---|
| 7,167,205 B2 | 1/2007 | Akiyama et al. | |
| 7,529,411 B2* | 5/2009 | Haupt | H04N 21/44008 |
| | | | 382/220 |
| 7,738,030 B2 | 6/2010 | Akiyama et al. | |
| 7,907,751 B2* | 3/2011 | Asano | G06K 9/72 |
| | | | 348/211.14 |
| 8,055,080 B2* | 11/2011 | Isomura | G06T 11/60 |
| | | | 382/224 |
| 8,059,915 B2* | 11/2011 | Sharon | G06T 7/246 |
| | | | 358/3.26 |
| 8,077,981 B2* | 12/2011 | Elangovan | G06K 9/6202 |
| | | | 382/209 |
| 8,098,896 B2* | 1/2012 | Isomura | G06T 11/60 |
| | | | 382/106 |
| 8,253,799 B2* | 8/2012 | Elangovan | G06K 9/6202 |
| | | | 348/157 |
| 8,385,658 B2* | 2/2013 | Elangovan | G06K 9/6202 |
| | | | 382/154 |
| 8,600,154 B2 | 12/2013 | Umeda et al. | |
| 8,611,673 B2* | 12/2013 | Aarabi | G06F 16/5854 |
| | | | 382/209 |
| 8,620,105 B2 | 12/2013 | Hori et al. | |
| 8,643,740 B2* | 2/2014 | Fukata | G06K 9/3241 |
| | | | 348/222.1 |
| 8,675,249 B2 | 3/2014 | Umeda et al. | |
| 8,929,681 B2 | 1/2015 | Umeda et al. | |
| 8,947,553 B2* | 2/2015 | Fukata | G06K 9/3241 |
| | | | 348/222.1 |
| 9,036,205 B2 | 5/2015 | Umeda et al. | |
| 9,052,742 B2 | 6/2015 | Hori et al. | |
| 9,082,013 B2* | 7/2015 | Yadani | G06K 9/72 |
| 9,088,753 B2 | 7/2015 | Akiba et al. | |
| 9,101,459 B2* | 8/2015 | Wexler | G06K 9/00483 |
| 9,189,681 B2 | 11/2015 | Kunieda et al. | |
| 9,214,027 B2 | 12/2015 | Sumi et al. | |
| 9,256,796 B2* | 2/2016 | Yoshigahara | G06K 9/228 |
| 9,275,270 B2 | 3/2016 | Suwa et al. | |
| 9,311,712 B2* | 4/2016 | Fukata | G06K 9/3241 |
| 9,311,896 B2* | 4/2016 | Matskewich | G09G 5/28 |
| 9,336,457 B2* | 5/2016 | Raykar | G06T 7/33 |
| 9,407,815 B2* | 8/2016 | Bostick | G06F 16/29 |
| 9,531,955 B2* | 12/2016 | Sato | H04N 5/23293 |
| 9,569,831 B2 | 2/2017 | Song et al. | |
| 9,594,534 B2 | 3/2017 | Sasaki et al. | |
| 9,602,691 B2 | 3/2017 | Miyake et al. | |
| 9,646,227 B2* | 5/2017 | Suri | G06K 9/6256 |
| 9,648,198 B2 | 5/2017 | Ishida et al. | |
| 9,704,221 B2 | 7/2017 | Hori et al. | |
| 9,716,827 B2* | 7/2017 | Bostick | G06F 16/29 |
| 9,769,352 B2 | 9/2017 | Yanai et al. | |
| 9,769,380 B2 | 9/2017 | Iguchi et al. | |
| 9,813,566 B2* | 11/2017 | Murata | G06T 11/60 |
| 9,946,429 B2* | 4/2018 | Viegers | G06F 3/0481 |
| 9,965,957 B2* | 5/2018 | Li | B60K 37/04 |
| 9,971,957 B2* | 5/2018 | Yoshigahara | G06K 9/228 |
| 10,013,622 B2* | 7/2018 | Chan | G06K 9/46 |
| 10,311,333 B2* | 6/2019 | Yoshigahara | G06K 9/228 |
| 2004/0201609 A1* | 10/2004 | Obrador | G06F 16/40 |
| | | | 715/723 |
| 2006/0221779 A1* | 10/2006 | Matsushita | G11B 27/034 |
| | | | 369/30.01 |
| 2006/0265369 A1* | 11/2006 | Atcheson | G06Q 30/02 |
| 2008/0049239 A1* | 2/2008 | Chiaki | G09G 3/2051 |
| | | | 358/1.9 |
| 2008/0110556 A1* | 5/2008 | Kawasaki | B60W 40/076 |
| | | | 156/238 |
| 2008/0166045 A1* | 7/2008 | Xu | G06K 9/00771 |
| | | | 382/170 |
| 2012/0002067 A1* | 1/2012 | Fukata | G06K 9/3241 |
| | | | 348/222.1 |
| 2012/0294514 A1* | 11/2012 | Saunders | G06K 9/00677 |
| | | | 382/159 |
| 2013/0222407 A1* | 8/2013 | Matskewich | G06T 11/203 |
| | | | 345/589 |
| 2014/0010464 A1* | 1/2014 | Umeda | G06K 9/6267 |
| | | | 382/224 |
| 2014/0013213 A1 | 1/2014 | Kajiwara et al. | |
| 2014/0029799 A1* | 1/2014 | Fukata | G06K 9/3241 |
| | | | 382/103 |
| 2014/0078177 A1* | 3/2014 | Yamaji | G06F 16/51 |
| | | | 345/634 |
| 2014/0198986 A1* | 7/2014 | Marchesotti | G06K 9/00684 |
| | | | 382/190 |
| 2014/0375860 A1* | 12/2014 | Sato | H04N 5/23293 |
| | | | 348/333.01 |
| 2015/0085139 A1* | 3/2015 | Fukata | G06K 9/3241 |
| | | | 348/169 |
| 2015/0189107 A1* | 7/2015 | Murata | G06T 11/60 |
| | | | 345/629 |
| 2016/0034786 A1* | 2/2016 | Suri | G06K 9/6256 |
| | | | 382/159 |
| 2016/0188962 A1* | 6/2016 | Taguchi | G06T 7/73 |
| | | | 382/117 |
| 2017/0039427 A1 | 2/2017 | Yamamoto et al. | |
| 2017/0039746 A1 | 2/2017 | Mizoguchi et al. | |
| 2017/0286383 A1* | 10/2017 | Koul | G06F 3/048 |
| 2017/0309011 A1 | 10/2017 | Hori et al. | |
| 2017/0316558 A1 | 11/2017 | Hori et al. | |
| 2017/0330463 A1* | 11/2017 | Li | B60K 37/04 |
| 2018/0040120 A1* | 2/2018 | Faelan | G06T 7/0012 |

OTHER PUBLICATIONS

Sarah Perez; XP55461338—Phototime is a Mobile Photo Gallery Capable of Image and Facial Recognition; retrieved Nov. 13, 2014—https://web.archive.org/web/20160409103917/http://techcrunch.com/2014/11/13/phototime-is-a-mobile-photo-gallery-capable-of-image-and-facial-recognition. (Year: 2014).*

Jackie Dove: XP55461341—Phototime iphone Employs Image Recognition Automatically Tag Group Photos published Nov. 13, 2014—https://web.archive.org/web/20161013070555/https://thenextweb.com/creativity/2014/11/13/phototime-iphone-employs-image-recognition-automatically-tag-group-photos. (Year: 2014).*

Prakash et al., "A new method for feature extraction and matching using the energy of Fourier basis." In Applications of Digital Image Processing XXVII, vol. 5558, pp. 735-742. International Society for Optics and Photonics, 2004. (Year: 2004).*

Nguyen et al., "Multifeature object tracking using a model-free approach." In Proceedings IEEE Conference on Computer Vision and Pattern Recognition. CVPR 2000 (Cat. No. PR00662), vol. 1, pp. 145-150. IEEE, 2000. (Year: 2000).*

Ziou et al., "Edge detection techniques—an overview," Patern Recognition and Image Anal., vol. 8, No. 4, 1998 (Year: 1998).*

* cited by examiner

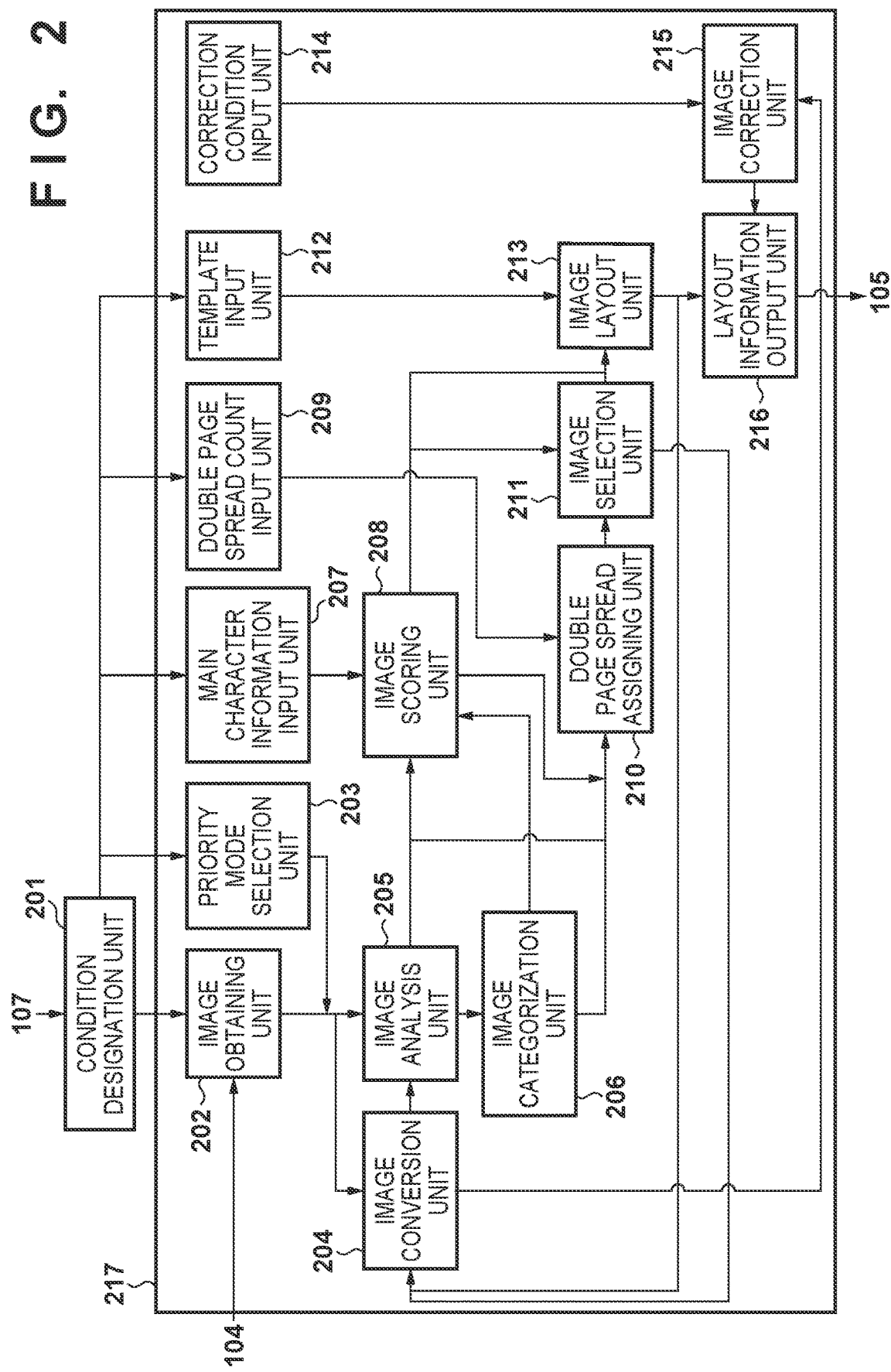

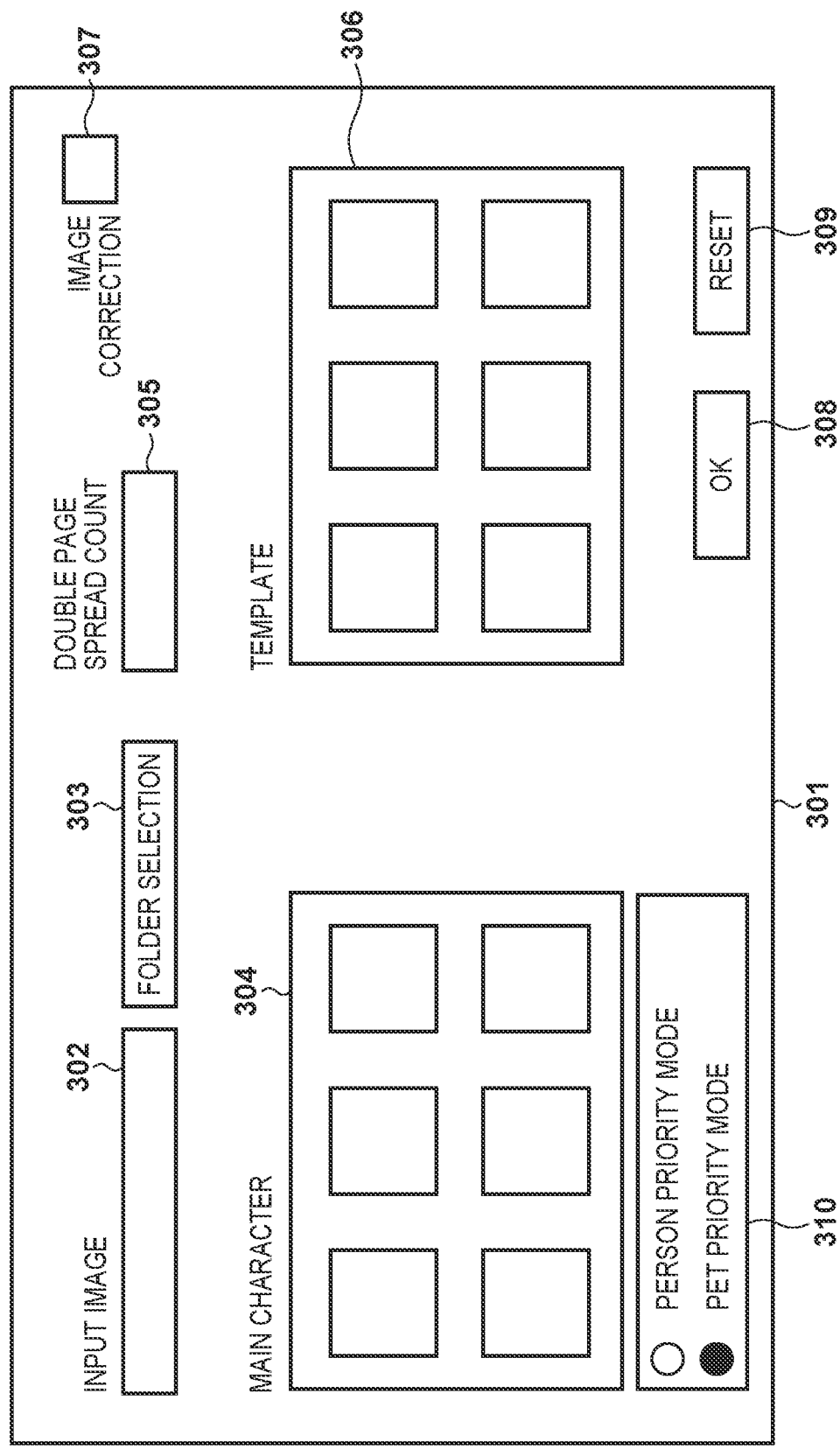

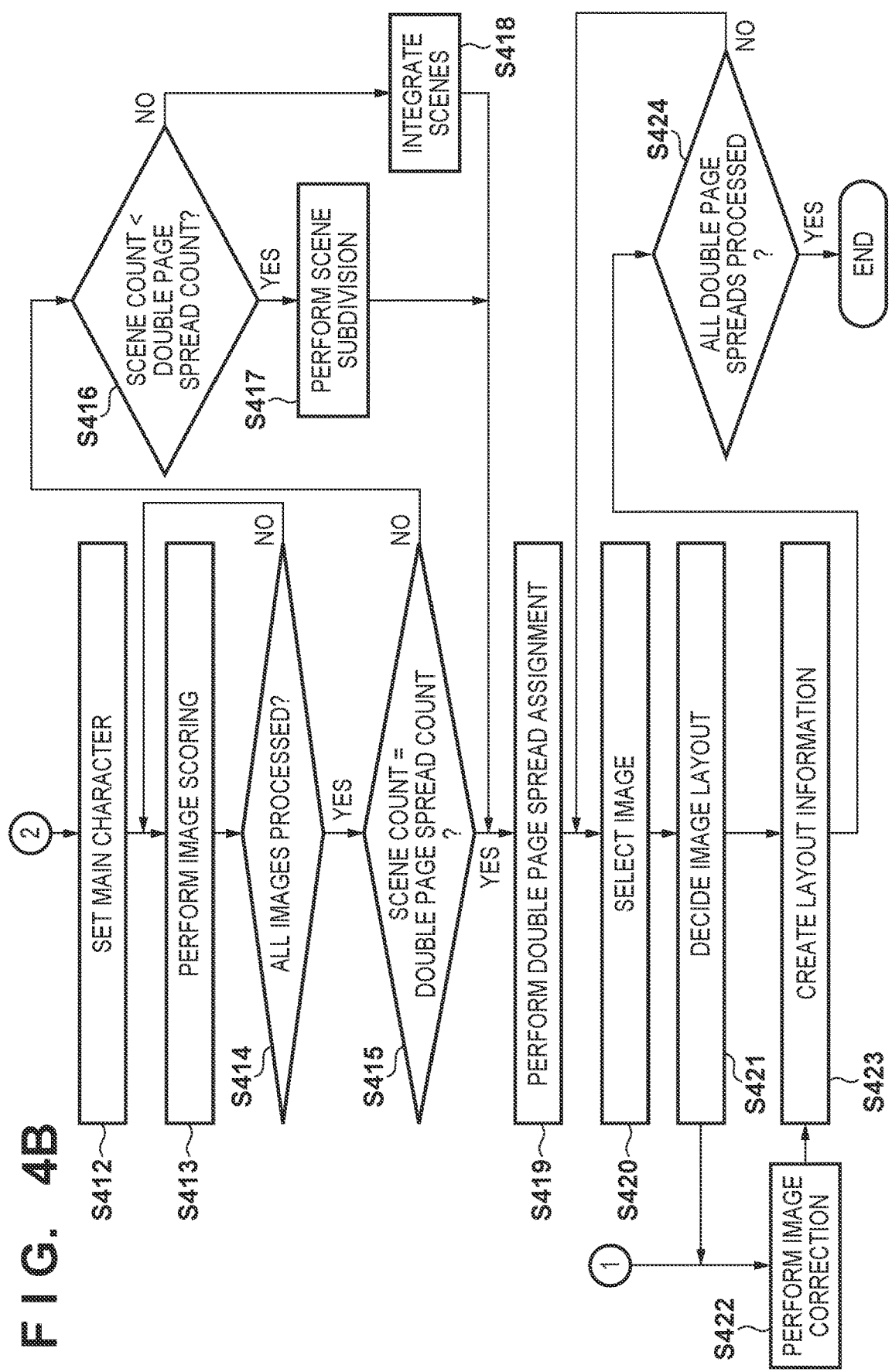

FIG. 5

| IMAGE ID (501) | CAPTURING DATE/TIME (502) | FOCUS (503) | NUMBER OF FACES (504) | PERSONAL ID (505) | | | | | | |
|---|---|---|---|---|---|---|---|---|---|---|
| | | | | 1 | | 2 | | 3 | | ... |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 2016/7/1 10h11m12s | ○ | 6 | 40,40 | 65,65 | 90,40 | 115,65 | 10,20 | 25,35 | ... |
| 2 | 2016/7/1 10h12m30s | ○ | 2 | 50,100 | 100,150 | 150,125 | 190,165 | — | — | ... |
| 3 | 2016/7/1 10h15m54s | ○ | 0 | — | — | — | — | — | — | ... |
| ... | ... | ... | ... | ... | ... | ... | ... | ... | ... | ... |

FIG. 7

| SCENE | CAPTURING PERIOD (HOURS) | | NUMBER OF CAPTURED IMAGES (PIECES) | | NUMBER OF CAPTURED PERSONS (PERSONS) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | IMAGE FEATURE OF MAIN SLOT | IMAGE FEATURE OF SUB-SLOT |
|---|---|---|
| TRAVEL | ZOOM-OUT IMAGE INCLUDING PERSON AND LANDSCAPE | CLOSE-UP OR PROFILE IMAGE |
| DAILY LIFE | CLOSE-UP OR PROFILE IMAGE | ZOOM-OUT IMAGE INCLUDING PERSON AND LANDSCAPE |
| CEREMONY | IMAGE IN WHICH DISTANCE BETWEEN TWO PERSONS IS SHORT | IMAGE INCLUDING MANY PERSONS |

FIG. 8B

| IMAGE ID | SCORE (50 AT MAXIMUM) | | |
|---|---|---|---|
| | MAIN SLOT (POINTS) | SUB-SLOT (POINTS) | SUB-SLOT (POINTS) |
| 1 | 20 | 40 | 30 |
| 2 | 45 | 10 | 25 |
| 3 | 10 | 20 | 15 |
| ... | ... | ... | ... |

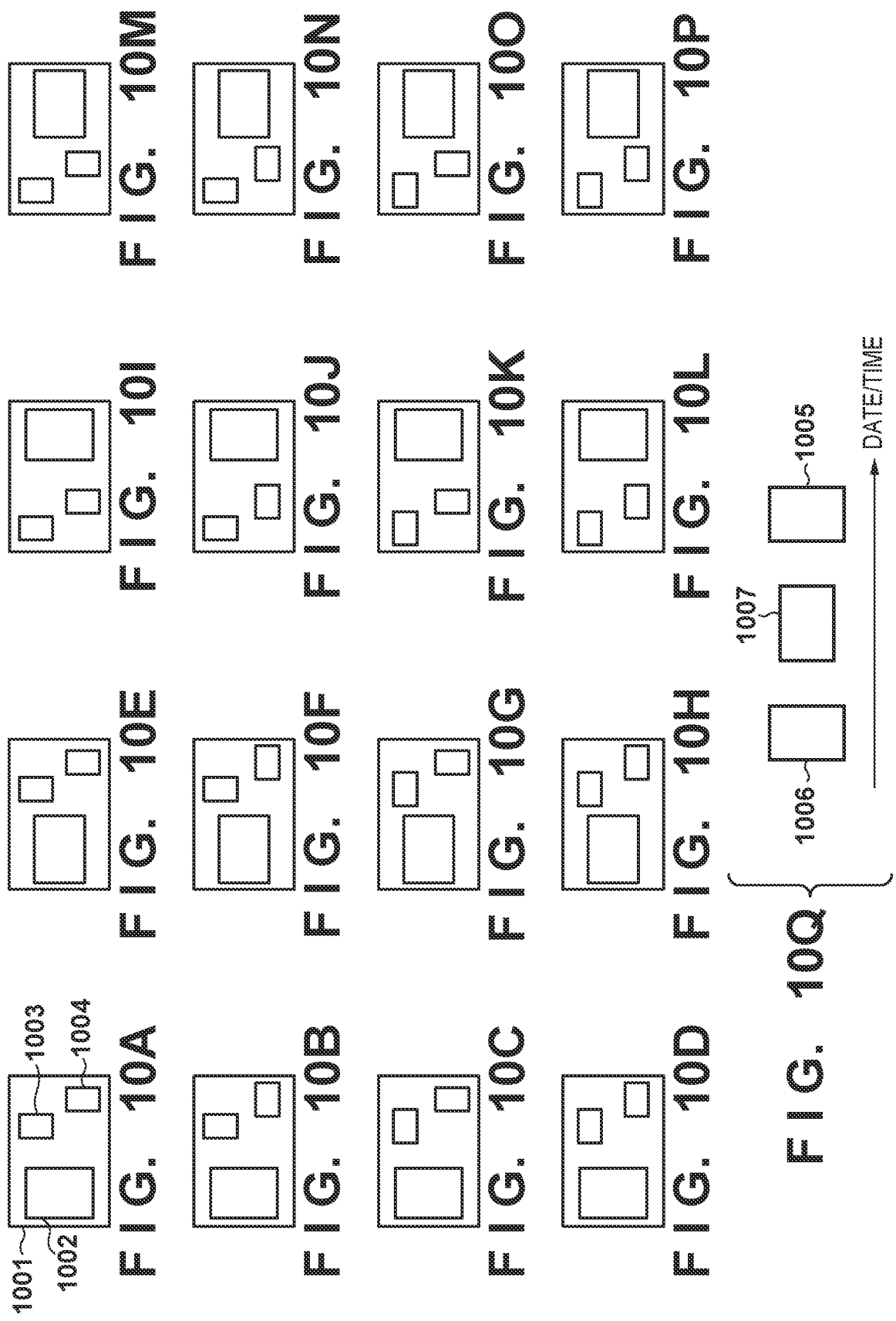

IMAGE PROCESSING APPARATUS AND METHOD WITH SELECTION OF IMAGE INCLUDING FIRST AND SECOND OBJECTS MORE PREFERENTIALLY THAN IMAGE INCLUDING FIRST BUT NOT SECOND OBJECT

BACKGROUND OF THE INVENTION

Field of the Invention

The present invention relates to a technique of selecting at least one image from a plurality of images based on a predetermined criterion.

Description of the Related Art

In recent years, album creation services each having an automatic layout function for promoting effective use of an enormous amount of image data has started to be provided. In the automatic layout, some or all processes for album creation, for example, automatically selecting images to be included in an album, automatically deciding a template to be used in the album, and automatically assigning the images to the template are automatically performed. According to the automatic layout function, the user can quickly create an album. In some cases, the user can use an automatically produced album as a creation guide when creating an album meeting the user's taste.

In the automatic image selection, the user designates an object, and an image including the object can be selected. Japanese Patent Laid-Open No. 2007-058795 describes a technique of causing a user to set conditions to select images to be used and automatically selecting an image to be used for a predetermined application purpose from a plurality of images. According to the technique described in Japanese Patent Laid-Open No. 2007-058795, it is possible to, for example, preferentially select an image including a specific object or preferentially select an image determined as a person image as an image to be used.

Japanese Patent Laid-Open No. 2007-058795 describes that it is determined whether an object designated by a user is included in an image. However, what kind of state the object is included in is not taken into consideration. As a result, for example, if the user designates a pet dog, only images of the dog facing the front are selected, and monotonous boring images are automatically selected for an album. As a result, only images without variations may be selected for the album, and it may be impossible to create an album that meets the user's taste.

SUMMARY OF THE INVENTION

The present invention provides a technique of automatically selecting a variety of images from a plurality of images.

According to one aspect of the present invention, there is provided an image processing apparatus comprising: a recognition unit configured to recognize a first object and a second object associated with the first object in a plurality of images; a calculation unit configured to calculate a score for each of the plurality of images based on a result of the recognition of the first object and the second object; and a selection unit configured to select an image concerning the first object from the plurality of images based on the score for each of the plurality of images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a software block diagram showing an example of the functional arrangement of an album creation application;

FIG. 3 is a view showing a display screen provided by the album creation application;

FIGS. 4A and 4B illustrate flowcharts showing automatic layout processing;

FIG. 5 is a view showing image analysis information;

FIG. 7 is a table showing statistical information specified for each scene;

FIGS. 8A and 8B are tables showing the concept of a scoring axis;

FIGS. 10A to 10Q are views showing a template group used for layout of image data;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In this embodiment, a procedure of operating an album creation application (application) on an image processing apparatus and generating an automatic layout will be described. Note that in the following explanation, an "image" includes a still image, a moving image, and a frame image in a moving image unless it is specifically stated otherwise. In addition, the image also includes a still image, a moving image, and a frame image in a moving image, which are held on a network, for example, in a service on the network or in a storage on the network and can be obtained via the network.

(Apparatus Arrangement)

Figure 1:
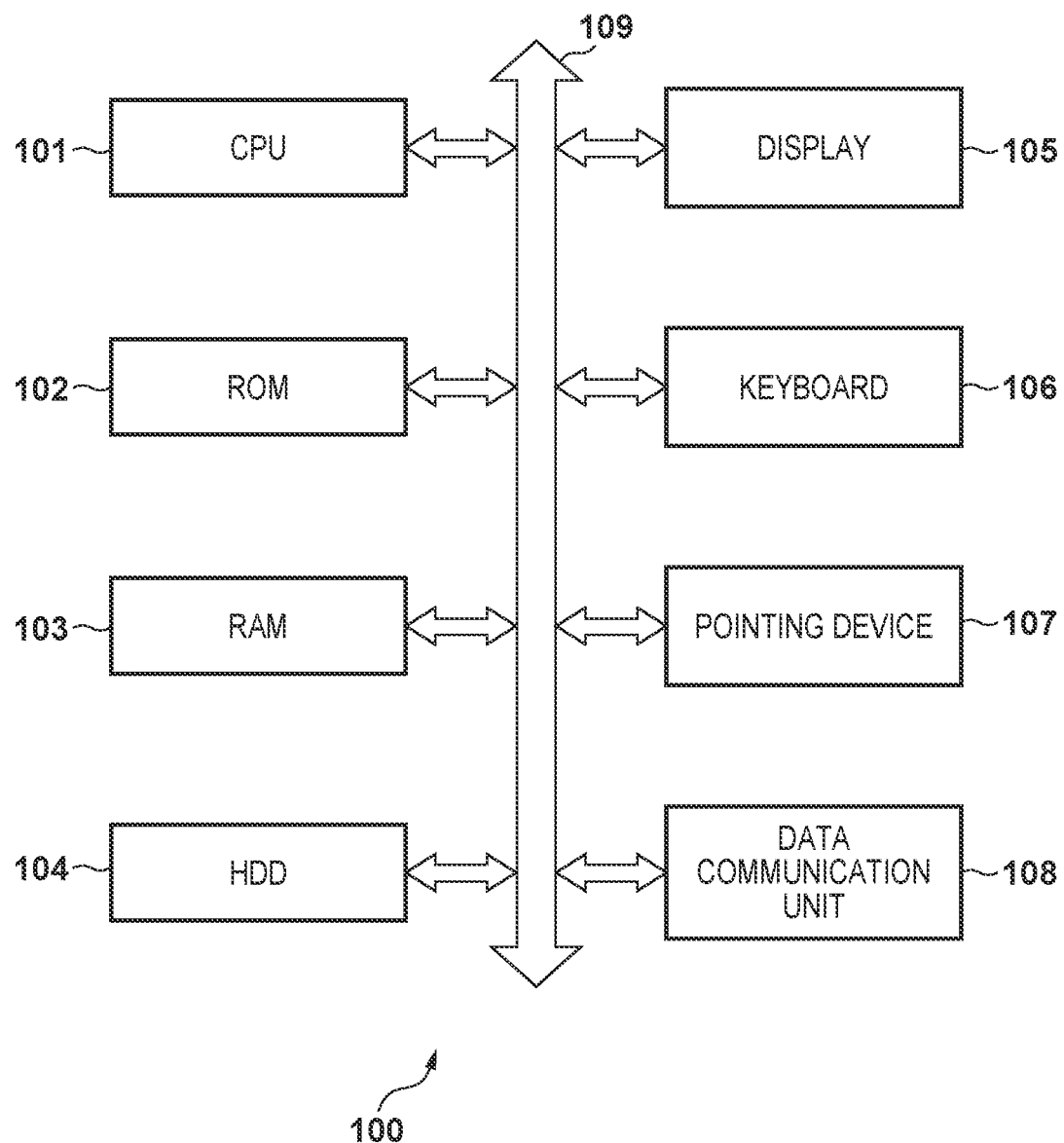
FIG. 1 is a block diagram showing an example of the hardware arrangement of an image processing apparatus.

FIG. 1 is a block diagram showing the hardware arrangement of an image processing apparatus 100 according to this embodiment. Note that examples of the image processing apparatus are a personal computer (PC) and a smartphone. In this embodiment, a PC is used. A CPU (central processing unit/processor) 101 generally controls the image processing apparatus 100 and, for example, loads a program stored in a ROM 102 into a RAM 103 and executes the program, thereby implementing an operation according to the embodiment. Note that the CPU can be replaced with an arbitrary processor. FIG. 1 shows one CPU. However, a plurality of processors may be included. The ROM 102 is a general-purpose ROM (Read Only Memory) and, for example, stores a program to be executed by the CPU 101. The RAM 103 is a general-purpose RAM (Random Access Memory) and, for example, is used as a working memory configured to temporarily store various kinds of information when the CPU 101 executes a program. An HDD (Hard Disk Drive) 104 is a storage medium (storage unit) configured to store a database for holding a still image file, a moving image file, a processing result of image analysis, and the like, or templates and the like used by the album creation application.

A display 105 displays a user interface (UI) according to this embodiment or an image layout result to the user. A keyboard 106 and a pointing device 107 accept instruction operations from the user. The keyboard 106 is used when, for example, the user inputs the double page spread count of an album to be created on the UI displayed on the display 105. The pointing device 107 is a coordinate pointing device and is used when, for example, the user clicks on a button on the UI displayed on the display 105. Note that the display 105 may have a touch sensor function, and acceptance of an instruction operation from the user may be done by the display 105.

A data communication unit 108 communicates with an external device via a wired or wireless network or with an external device directly connected to the image processing apparatus. The data communication unit 108 transmits, for example, data laid out by an automatic layout function to a printer or server that can communicate with the image processing apparatus 100. In addition, the data communication unit 108 can receive a still image or moving image from a server or SNS on a network, which can communicate with the image processing apparatus 100. A data bus 109 connects the above-described units to the CPU 101.

The album creation application according to this embodiment is saved in for example, the HDD 104, and is activated in accordance with a user's double click on the icon of the application displayed on the display 105 using the pointing device 107.

Note that FIG. 1 illustrates an example of the hardware arrangement assuming a desktop personal computer or a game machine. However, the present invention is not limited to this. For example, the image processing apparatus 100 may be a portable smart device. Even in this device, the following functions and processes can be implemented. Additionally, FIG. 1 shows an example of the hardware arrangement assuming the image processing apparatus 100 in a local environment. However, a system including at least one device such as a server on a network may implement the following functions and processes. In this case, the device such as a server can have, for example, the arrangement shown in FIG. 1 and execute some or all of the following functions and processes. If the device such as a server implements the following functions and processes, an image saved in the server may be used, or an image that the user uploads from, for example, a local terminal to the server may be used.

FIG. 2 is a software block diagram showing an example of the functional arrangement of the album creation application. In particular, FIG. 2 shows a software block diagram concerning an automatic layout processing unit 217 that executes an automatic layout function. By the automatic layout function, a captured still image or moving image is categorized or selected based on its contents or attribute and laid out, thereby generating an album image to be displayed on the display 105. Note that the CPU 101 executes the album creation application saved in the HDD 104, thereby functioning as each block shown in FIG. 2.

A condition designation unit 201 outputs, to the automatic layout processing unit 217, for example, an album creation condition according to the input of a user's UI operation (to be described later) using the pointing device 107. Conditions to be designated can include, for example, the ID of a target image or a main character, the double page spread count of an album, template information, an ON/OFF condition of image correction, and an ON/OFF condition of moving image use. Designation of an image may be done based on additional information or attribute information of individual image data such as a capturing date/time, or based on the structure of a file system including image data such as a designation of a device or directory (folder). Note that "double page spread" corresponds to, for example, a pair of pages adjacent to each other displayed on one window in display or printed on different sheets in printing. Note that the condition designation unit 201 according to this embodiment can also designate, for example, whether to set person priority or pet priority to the object of an image to be employed in an album.

An image obtaining unit 202 obtains an image data group of still images or moving images designated by the condition designation unit 201 from the HDD 104 (in some cases, from a server or SNS on a network via the data communication unit 108). Note that the still images or moving images are obtained by, for example, image capturing by an image capturing device such as a digital camera or a smart device. The image processing apparatus may incorporate the image capturing device or may obtain an image capturing result from an external image capturing device. Note that if the image capturing device is an external device, image data can be received by the HDD 104 or supplied to the automatic layout processing unit 217 via, for example, the data communication unit 108. A priority mode selection unit 203 inputs information that designates whether to preferentially select a person image or a pet image for an album to be created to an image analysis unit 205 in accordance with the designation from the condition designation unit 201.

An image conversion unit 204 converts image data to be used in subsequent processing into a desired number of pixels or color information. In this embodiment, the image conversion unit 204 converts image data into analysis image data (to be referred to as an "analysis image" hereinafter) including 420 pixels along the short side and sRGB color information. From the analysis image, the image analysis unit 205 executes the processes of feature amount obtaining, face detection, expression recognition, and personal recognition to be described later. In addition, the image analysis unit 205 executes obtaining of data added to image data obtained from the HDD 104 or from a network via the data communication unit 108, for example, obtaining of capturing date/time information from Exif information.

An image categorization unit 206 executes scene division or scene categorization (to be described later) for the image data group using capturing date/time information, the number of captured images, detected face information, or the like. Here, the scene is, for example, a captured scene of a travel, daily life, wedding, or the like. Image data corresponding to one scene is regarded as, for example, a group of images captured in association with one capturing target in the capturing opportunity of one period. A main character information input unit 207 inputs the ID (identification information) of a main character designated by the condition designation unit 201 to an image scoring unit 208. The image scoring unit 208 performs scoring for each image data such that an image suitable for layout obtains a high score. The image scoring unit 208 performs scoring using information from the image analysis unit 205 and information from the image categorization unit 206, for example, as will be described later. Additionally, the image scoring unit 208 can be configured to give a higher score to image data including a main character ID input from the main character information input unit 207. Furthermore, the image scoring unit 208 can be configured to give a higher score to image data including an object in a case in which the object other than persons is recognized based on the priority mode designated by the condition designation unit 201. Note that the image scoring unit 208 may perform scoring additionally or alternatively using information other than the information from the image analysis unit 205 and the information from the image categorization unit 206.

A double page spread count input unit 209 inputs the double page spread count of an album designated by the condition designation unit 201 to a double page spread assigning unit 210. The double page spread count of an album corresponds to the number of plural templates in which a plurality of images are arranged. The double page spread assigning unit 210 divides (grouping) the image data group based on the double page spread count input from the double page spread count input unit 209, and assigns the image data to each double page spread of the album. The double page spread assigning unit 210 divides the image data group in accordance with the input double page spread count, and a part (divided part) of the image data group to each double page spread. Based on the score added by the image scoring unit 208, an image selection unit 211 selects an image from the part of the image data group assigned to each double page spread by the double page spread assigning unit 210.

A template input unit 212 inputs a plurality of templates according to template information designated by the condition designation unit 201 to an image layout unit 213. The image layout unit 213 selects a template suitable for the image data selected by the image selection unit 211 for the plurality of templates input from the template input unit 212, and decides the layout of the image data. A layout information output unit 216 outputs layout information to be displayed on the display 105 in accordance with the layout of the image data group decided by the image layout unit 213. The layout information is, for example, bitmap data in which the image data selected by the image selection unit 211 is laid out in the selected template.

A correction condition input unit 214 inputs an ON/OFF condition of image correction designated by the condition designation unit 201 to an image correction unit 215. The ON/OFF of image correction may be designated for each type of correction or may be designated for all types together. The correction can include, for example, at least one of brightness correction, red-eye correction, and contrast correction. If the image correction condition is ON, the image correction unit 215 executes correction for the image data. If the image correction condition is OFF, the image correction unit 215 does not execute correction. Note that the image correction unit 215 performs correction of the image data input from the image conversion unit 204 in accordance with the ON/OFF of correction. The number of pixels of the image data input from the image conversion unit 204 to the image correction unit 215 can be changed in accordance with the size of the layout decided by the image layout unit 213.

When the album creation application is installed in the image processing apparatus 100, the activation icon of the application is displayed on the top screen (desktop) of an OS (Operating System) that operates on the image processing apparatus 100. If the user double-clicks on the activation icon displayed on the display 105 by the pointing device 107, the program of the album creation application saved in the HDD 104 is loaded into the RAM 103. When the CPU 101 executes the program in the RAM 103, the album creation application is activated. Note that the image processing apparatus 100 may be configured to store the program in the ROM 102.

(Example of Display Screen)

FIG. 3 is a view showing an example of a display screen 301 provided by the album creation application. The display screen 301 is displayed on the display 105. The user sets album creation conditions to be described later via the display screen 301, and the condition designation unit 201 obtains the set contents from the user.

A path box 302 on the display screen 301 displays the storage location (path) of an image data group as an album creation target in the HDD 104. When the user clicks on a folder selection button 303 using the pointing device 107, a folder including the image data group as the album creation target is displayed in a tree structure so that the user can select it. A folder path including the image data group selected by the user is displayed in the path box 302. Note that the user may directly input the folder path to the folder including the image data group as the album creation target to the path box 302 via the keyboard 106.

A main character designation icon 304 is an icon to specify a main character that should be specified as a main person from persons included in an image (for example, a photo) of an analysis target. A face image of a person is displayed as an icon. In the main character designation icon 304, for example, a face image of a person is displayed, which is manually selected by the user or automatically set in accordance with a procedure to be described later from face images of the person registered in a face database. In the main character designation icon 304, icons of a plurality of different face images may be arranged and displayed. Note that the icons of face images are, for example, detected from images in advance, associated with individual IDs, and registered in the face database. The user clicks on the main character designation icon 304 using the pointing device 107, thereby displaying the face images stored in the face database. The user selects at least one of the displayed face images, thereby manually selecting a main character. A priority mode selection button 310 is a button that accepts a user designation concerning whether to preferentially select a person image or a pet image for the album to be created.

A double page spread count box 305 accepts the setting of a double page spread count of the album from the user. The user can directly input a number to the double page spread count box 305 via the keyboard 106 or input a number from a list to the double page spread count box 305 using the pointing device 107. A template designation icon 306 displays an illustration image for each template taste (pop, stylish, or the like). In the template designation icon 306, a plurality of template icons are arranged and displayed. The user can select one of the templates by clicking using the pointing device 107. An image correction checkbox 307 accepts the designation of ON/OFF of image correction from the user. A state with a checkmark is a state in which image correction ON is designated. A state without a checkmark is a state in which image correction OFF is designated. In the example of FIG. 3, ON or OFF is designated together for all corrections of one or more types. Note that ON or OFF may be designated individually for the corrections of one or more types or for each predetermined unit.

An OK button 308 is a button used to transmit a state designated on the display screen 301 to the condition designation unit 201. When the user presses the OK button 308, the condition designation unit 201 obtains the contents set on the display screen 301. The condition designation unit 201 outputs the obtained set contents to the automatic layout processing unit 217 of the album creation application. At this time, the path input to the path box 302 is transmitted to the image obtaining unit 202. The individual ID of the main character selected in the main character designation icon 304 is transmitted to the main character information input unit 207. The double page spread count input to the double page spread count box 305 is transmitted to the double page spread count input unit 209. The template information selected in the template designation icon 306 is transmitted to the template input unit 212. The ON/OFF designation of image correction in the image correction checkbox 307 is transmitted to the correction condition input unit 214. In addition, priority mode designation information by the priority mode selection button is transmitted to the priority mode selection unit 203.

A reset button 309 on the display screen 301 is a button used to reset the setting information on the display screen 301.

(Procedure of Processing)

Figure 4A:
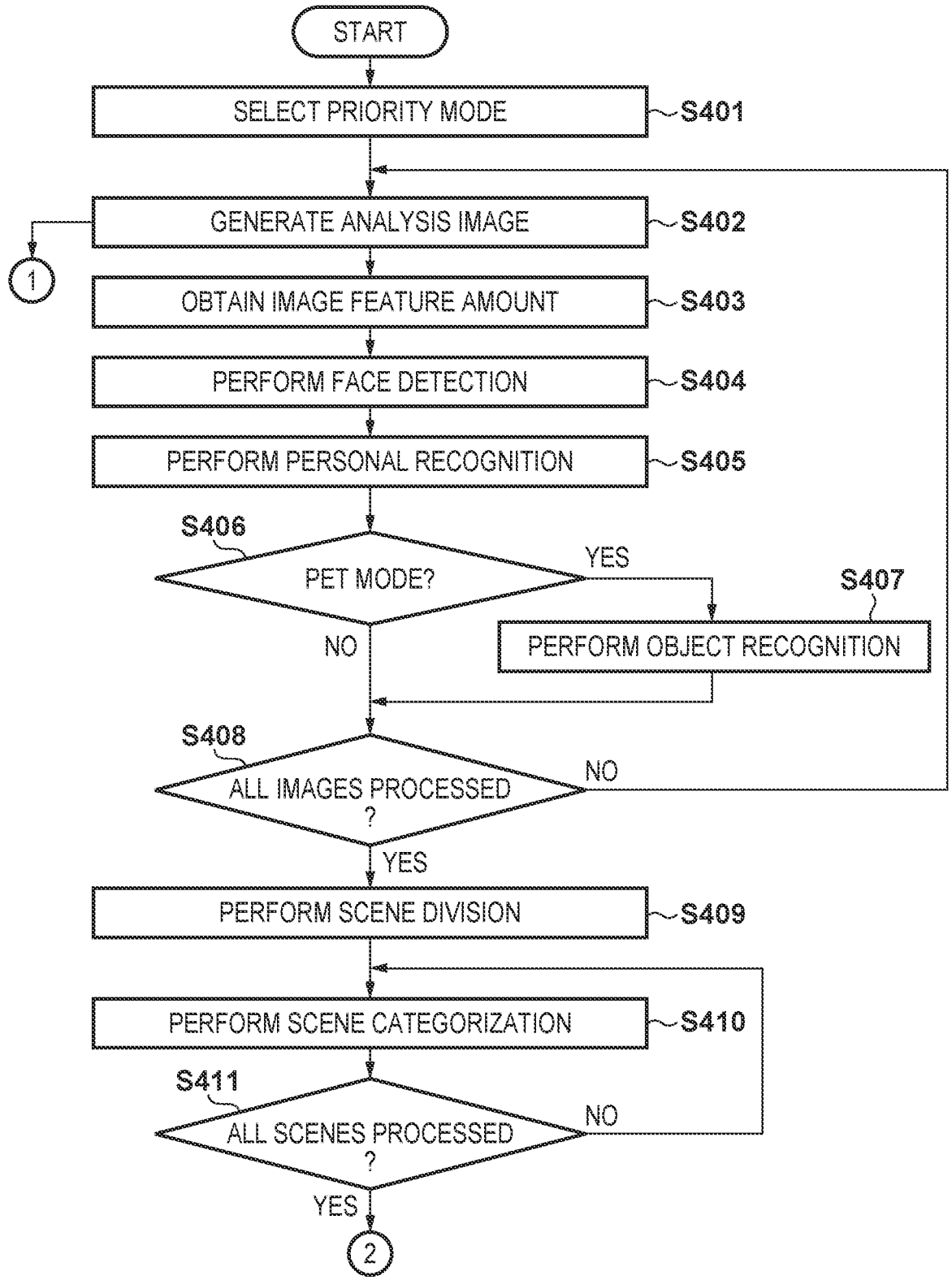

The procedure of processing executed by the automatic layout processing unit 217 of the album creation application will be described next with reference to FIGS. 4A and 4B. The processing shown in FIGS. 4A and 4B is implemented when, for example, the CPU 101 reads out the program stored in the HDD 104 to the ROM 102 or the RAM 103 and executes it.

First, the automatic layout processing unit 217 accepts a priority mode selection from the user (step S401). That is, the automatic layout processing unit 217 accepts a designation concerning which one of a person priority mode to preferentially select a person image and a pet priority mode to preferentially select a pet image is used to do an operation for an album to be created.

Next, the image conversion unit 204 generates an analysis image of an image of interest (step S402). That is, the image conversion unit 204 converts each image in an image group stored in the HDD 104 and designated by the condition designation unit 201 into an image including a desired number of pixels and color information. In this embodiment, the image of interest is converted into an analysis image including 420 pixels along the short side and sRGB color information.

After that, the image analysis unit 205 obtains the image feature amount of the image of interest from, for example, the analysis image generated in step S402 (step S403). The image analysis unit 205 obtains a capturing date/time from, for example, Exif information added to the image of interest obtained from the HDD 104. The image analysis unit 205 may obtain position information concerning a position where the image of interest is captured. The image analysis unit 205 may also obtain information about a capturing device used when capturing the image of interest. In addition, the image analysis unit 205 obtains the number of pixels of the image from the Exif information or identification information added at the time of image obtaining. The image analysis unit 205 obtains a feature amount from the analysis image obtained by converting the image of interest. The feature amount is, for example, focus.

For example, edge detection is performed for the image of interest using a Sobel filter generally known as an edge detection method. The brightness difference between the start point and the end point of an edge is divided by the distance between the start point and the end point, thereby calculating the gradient of the edge, that is, the brightness gradient. From the result of calculating the average gradient of the edges in the target image, an image having a large average gradient can be considered to be in focus as compared to an image having a small average gradient. Hence, the value of the average gradient can be used as a feature amount. Here, a plurality of different thresholds are set for the average gradient, and which is the threshold equal to or less than the calculated average gradient is determined, thereby outputting the evaluation value of the focus amount. In this embodiment, two different thresholds (a first threshold and a second threshold; note that first threshold>second threshold) are set in advance, and the focus amount is determined in three levels ○, Δ, and x. For example, if the calculated average gradient is equal to or more than the first threshold, the focus amount is excellent (○). If the average gradient is less than the first threshold and equal to or more than the second threshold, the focus amount is tolerable (Δ). If the average gradient is less than the second threshold, the focus amount is intolerable (x). Letting ○ be a focus gradient that should be employed in an album, Δ be a tolerable focus gradient, and x be an intolerable focus gradient, the thresholds are set in advance. The thresholds may be provided by, for example, the creation source of the album creation application (for example, as values according to results such as experimental results), or may be set via a user interface. Note that different numerical values may be set to ○, Δ, and x as the focus amounts.

In step S404, the image analysis unit 205 executes face detection for the analysis image generated in step S402. A known method is usable for the face detection processing. For example, Adaboost that creates a strong classifier from a plurality of weak classifiers prepared can be used. In this embodiment, the face region of a person (object) is detected from a detection target image by a strong classifier created by Adaboost. The image analysis unit 205 extracts a face image and obtains the upper left coordinate values and the lower right coordinate values of the detected face region. By having the two types of coordinates, the image analysis unit 205 can obtain the position and size of the face region. Here, a strong classifier by Adaboost may be created using not a face but an object such as an animal, for example, a dog or a cat, a flower, a food, a building, or an ornament as the detection target in place of the face. The image analysis unit 205 can thus detect an object other than the face image.

Next, the image analysis unit 205 compares the face image detected in step S404 with a representative face image saved in a face dictionary database in association with each personal ID, thereby performing personal recognition (step S405). The image analysis unit 205 sets the ID of the highest similarity that is equal to or more than a threshold to the ID of the detected face image. Note that if the similarity is less than the threshold for all images registered in the face dictionary database, the image analysis unit 205 can register the extracted face image as a new face with a new personal ID in the face dictionary database.

As shown in FIG. 5, the image analysis unit 205 stores the pieces of image analysis information obtained in steps S403 to S405 in a storage area of the RAM 103 or the like in association with an ID 501 used to discriminate each image. For example, as shown in FIG. 5, capturing date/time information 502 and a focus discrimination result 503 obtained in step S403 and the number 504 of faces (regions) detected in step S404 and pieces of position information 505 are stored in a table format. Note that the position information of a face image is stored distinctively in association with each personal ID obtained in step S405.

After that, the automatic layout processing unit 217 determines based on the priority mode selected in step S401 whether the pet priority mode is selected (step S406). If the person priority mode is selected (NO in step S406), the automatic layout processing unit 217 advances the process to step S408. If the pet priority mode is selected (YES in step S406), the automatic layout processing unit 217 advances the process to step S407.

In step S407, the image analysis unit 205 recognizes objects other than persons in the analysis image generated in step S402. For example, the image analysis unit 205 recognizes objects other than persons, for example, a pet such as a dog or a cat, a toy (for example, a ball or a stuffed toy) of the pet, and an environment (for example, a grass, sea, window, or cushion) that enables estimation of an outdoor/indoor position of the pet. A known method is usable as the recognition method as well. For example, at least one of various techniques such as a pattern matching method, a method by machine learning, and CNN (Convolutional Neural Network) can be used. In an example of using CNN, the image analysis unit 205 calculates the reaction value (score) of each object existing in the image using a neural network capable of recognizing about 1,000 objects. For example, if the pet priority mode is selected in step S401, the image analysis unit 205 obtains the score of an object "dog" that is a main object from the result of CNN, and at the same time, obtains the scores of objects that are sub-objects such as a ball and a grass associated with the dog. Additionally, for example, for an object "cat" that is a main object, the image analysis unit 205 obtains not only the score of the object but also the scores of objects that are sub-objects such as a window and a cushion associated with the cat. Note that the candidates of sub-objects that can be associated with the main object can be set in advance and managed. If a sub-object candidate associated with the main object exists in the image, the image analysis unit 205 can recognize it and give a score. The image analysis unit 205 sends these scores to the image scoring unit 208 that executes the process of step S413 to be described later.

In step S408, it is determined whether the processes of steps S402 to S407 end for all image data of the image data group in the HDD 104 designated by the condition designation unit 201. Upon determining that the processes do not end (NO in step S408), the process from step S402 is executed for image data that has not undergone the processes. Upon determining that the processes end (YES in step S408), the process advances to step S409.

In step S409, the image categorization unit 206 executes scene division. The image categorization unit 206 divides the image data group into a plurality of scenes based on the time difference between images calculated from the capturing date/time information obtained in step S403. In this embodiment, scene division, for example, scene division is performed in accordance with the following criterion.

1. If a day without capturing exists between image data, the image data are divided.
2. If capturing days continue between image data, but the time difference is 16 hrs or more, the image data are divided.
3. If capturing days continue between image data, and the time difference is less than 16 hrs, the image data are divided as the same scene in a case in which the time difference from the first capturing to the last capturing in each of the consecutive days is less than 4 hrs.
4. If capturing days continue between image data, the time difference is less than 16 hrs, and the time difference from the first capturing to the last capturing in each of the consecutive days is 4 hrs or more, the image data are divided as the same scene in a case in which the number of captured images in each of the consecutive days is less than 50.

Figure 6A:
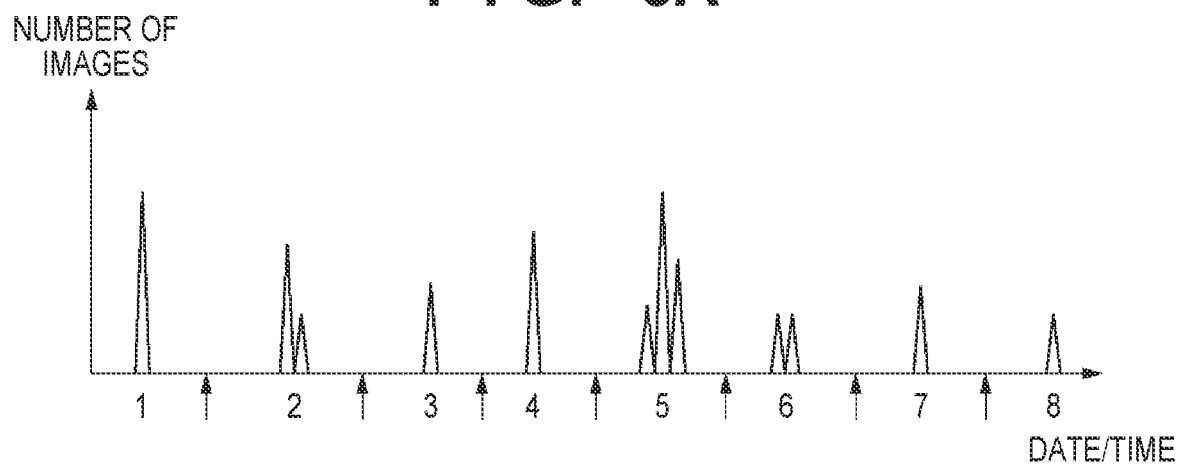
FIGS. 6A to 6C are views showing results of division of an image data group.

The image categorization unit 206 first places focus on, for example, the image with the earliest capturing date/time in the image data group, and refers to the time difference between the image and the next oldest image. While sequentially replacing the image of interest with an image of a later capturing date/time, the image categorization unit 206 refers to the time difference by the same method, and determines which one of the above-described conditions is met. The image categorization unit 206 may perform the above-described time difference referring and division determination sequentially from a new image to an old image in the image data group. Note that "division" here means dividing (grouping) the image data group to an early capturing date/time side and a later capturing date/time side from a boundary set between two images of interest. Note that the division may be done based on another criterion. For example, in a case in which a capturing location is included in the additional information of each image, the image categorization unit 206 may divide the image data for different capturing locations on the condition that the capturing locations are apart by a predetermined distance or more even if times do not satisfy the above-described division conditions. FIG. 6A is a view showing an example of the result of performing scene division of an image data group by the above-described scene division method. In the example shown in FIG. 6A, the image group is divided into eight scenes.

After that, the image categorization unit 206 executes scene categorization (step S410). In this embodiment, the image categorization unit 206 categorizes, for example, the image data of a divided image group that has undergone scene division into one of scenes "travel", "daily life", and "ceremony". In this embodiment, an example in which scene types are "travel", "daily life", and "ceremony", and a sub-image group is categorized into one of the scenes will be described. Note that scene categorization scoring is performed using a scene categorization table that stores the information of a feature amount corresponding to each scene type.

A method of creating the scene categorization table stored in the program in advance will be described here. First, the program designer collects a plurality of image data groups determined in advance to be categorized into the scenes "travel", "daily life", and "ceremony", and the feature amounts of the collected image data groups are obtained. Examples of the feature amounts obtained here are the capturing period, the number of captured images, and the number of captured persons. The capturing period is the capturing time difference between image data generated first and image data generated finally in each image data group. The number of captured images is the number of images of each image data group. The number of captured persons is the average number of faces included in each image represented by each image data group. As a result, for example, the feature amounts "capturing period", "number of captured images", and "number of captured persons" are obtained for one image data group including a plurality of image data determined in advance as travel scenes. Note that the feature amounts are not limited to the capturing period, the number of captured images, and the number of captured persons. Another feature amount may be used, or only one of them may be used.

The above-described obtaining of the feature amounts "capturing period", "number of captured images", and "number of captured persons" is performed for other image data groups collected in advance as well. Next, based on the feature amounts obtained from the plurality of image data groups collected for each scene, the average value and standard deviation of the capturing period, the average value and standard deviation of the number of captured images, and the average value and standard deviation of the number of captured persons per image are obtained. The thus obtained values are associated with each scene type, thereby creating a scene categorization table (FIG. 7) representing the average value and standard deviation for each scene type. FIG. 7 shows an example of a table 700 representing the specified average values and standard deviations. The main program of the album creation application can incorporate the table 700 as shown in FIG. 7 in advance. In the table 700, the average value and standard deviation are registered for each of a capturing period 702, the number 703 of captured images, and the number 704 of captured persons in association with a scene ID 701.

In step S410, the average values of the capturing period, the number of captured images, and the number of captured persons are calculated for each divided image group obtained as the result of performing scene division for the image data group designated by the path box 302 or the like in step S409 after the activation of the album creation application. For the feature amounts of the capturing period, the number of captured images, and the number of captured persons in each divided group, the image categorization unit 206 performs scoring using the average value and standard deviation of each scene shown in FIG. 7 by $$\text{Score}=50-|10\times(\text{average value}-\text{feature amount})/\text{standard deviation}| \quad (1)$$

$$\text{Average score}=(\text{score of capturing period}+\text{score of number of captured images}+\text{score of number of captured persons})/\text{number of feature amount items} \quad (2)$$

Here, equation (1) is calculated for each of the capturing period, the number of captured images, and the number of captured persons, and equation (2) is calculated from the calculation result of equation (1). Note that these calculations are performed for each scene, and an average score corresponding to all scenes is calculated for one divided image group. At this time, as the average value and standard deviation used in equation (1), the values registered in the table 700 are used. As the feature amount, the value for each of the capturing period, the number of captured images, and the number of captured persons of each divided image group is used. In this example, the number of feature amount items is three.

As a result of the above-described calculations, the average score is calculated for each of the scenes "travel", "daily life", and "ceremony" in each divided image group. The image categorization unit 206 categorizes the image data of each divided group into one of the above scenes, which corresponds to the maximum score. If a plurality of scenes have the same score, the categorization is performed in accordance with a predetermined scene priority order. For example, in this embodiment, the priority order is set to daily life>ceremony>travel, and a daily scene has the highest priority. For example, assume that in divided image group 5 after scene division shown in FIG. 6A, the capturing period is 36 hrs, the number of captured images is 300, and the number of captured persons is 1.7. In this case, the average score of the travel scene calculated by equations (1) and (2) is 45.32, the average score of the daily scene is 18.38, and the average score of the ceremony scene is −29.92. Hence, divided image group 5 is categorized into the travel scene. The image categorization unit 206 manages the categorized scene by adding a scene ID so that it can be identified.

In step S411, it is determined whether the scene categorization of step S410 is ended for all divided image groups divided in step S409. Upon determining that the scene categorization is not ended (NO in step S411), the process of step S410 is executed for a divided image group that has not yet undergone the scene categorization. Upon determining that the scene categorization is ended (YES in step S411), the process advances to step S412.

In step S412, the image scoring unit 208 executes main character setting. The main character setting is executed for an image data group designated by the user, and one of two methods, that is, an automatic setting method and a manual setting method is used. The image scoring unit 208 can obtain the number of times of appearance of each personal ID in the image data group, the number of times of appearance of each personal ID in each scene, and the number of scenes in which each personal ID appears based on the result of personal recognition executed in step S405 and the result of scene division executed in step S409. Based on these pieces of information, the image scoring unit 208 can automatically set a main character without a user designation. In this embodiment, if a plurality of scenes exist for one album, the image scoring unit 208 sets a personal ID that appears many times in the plurality of scenes to a main character ID. If only a single scene exists, the image scoring unit 208 sets a personal ID that appears many times in the single scene to a main character ID. If the user makes a designation in the main character designation icon 304, the main character information input unit 207 transmits the designated personal ID to the image scoring unit 208. If the user designates a personal ID, the image scoring unit 208 sets the personal ID designated by the user to a main character ID in place of the above-described automatically set main character ID. This setting is called manual setting.

In step S413, the image scoring unit 208 executes scoring. Scoring means giving a score (performing scoring) of evaluation from a viewpoint to be described later for each image data, and the score is referred to at the time of selection of image data used for layout to be described later. FIGS. 10A to 10Q are views showing a template group used for layout of image data. Each of a plurality of templates included in the template group corresponds to a double page spread. A template 1001 is one template. A slot 1002 represents a main slot. Slots 1003 and 1004 represent sub-slots. The main slot 1002 is the main slot (a frame to lay out an image) in the template 1001, and has a size larger than that of each of the sub-slots 1003 and 1004. The image scoring unit 208 gives both a score for a main slot and a score for a sub-slot to each image data.

FIG. 8A is a table showing the features of images to be employed in an album in correspondence with each of the scenes "travel", "daily life", and "ceremony" for the main slot and the sub-slot. As shown in FIG. 8A, the viewpoints of images considered to be appropriately selected for the main slot and the sub-slot change between the scenes "travel", "daily life", and "ceremony". For example, in a travel scene, an image including both a symbolic scenery during a travel and a person who plays the leading role in the travel can be appropriate as a main slot image. In a ceremony scene, an image including a bride and bridegroom standing closely together (a photo in which the distance between the two persons is short) can be appropriate as a main slot image. In a daily scene, a close-up image of the main character's face or a profile image can be appropriate as a main slot image. In addition, the image appropriate for each scene need not be limited to one type. For example, in the travel scene, not only an image including both a scenery and a person, as described above, but a close-up image of a face or a profile image, an image obtained by commemorative capturing with a person accompanying or encountered in the travel, images of a food, a building, and a landscape during the travel, and the like can also be appropriate. As described above, one or more different appropriate image conditions exist for each scene. Note that in this embodiment, two appropriate image conditions used to calculate scores of two patterns, that is, a score for a main slot and a score for a sub-slot are set for each scene.

In the table shown in FIG. 8A, a plurality of image data determined to match each of the feature of an image suitable for the main slot and the feature of an image suitable for the sub-slot of each scene are collected in advance. Note that for each of the collected image data, feature amounts including the number of faces included in the image data, the positions of the faces, and the sizes of the faces are extracted in advance. The average value and standard deviation of the feature amounts are calculated for each scene and each of the slot types (the main slot and the sub-slot) corresponding to the collected image data, and stored together with the program of the album creation application.

Based on the result of scene categorization of step S410, the image scoring unit 208 can obtain to which scene each image data belongs. Using the average value and standard deviation obtained in advance in correspondence with the scene of image data of interest and the feature amounts including the number of faces with the main character ID, the face positions, and the face sizes in the image data of interest, the image scoring unit 208 calculates an average score by Score=50−|10×(average value−feature amount)/standard deviation| (3)

Average score=(score of number of faces+score of face position+score of face size)/number of feature amount items (4)

The image scoring unit 208 executes the above-described scoring for both the images for the main slot and the images for the sub-slot. Here, since an image in focus is appropriately used in an album, a predetermined score may be added to image data of an image ID for which the feature amount of focus shown in FIG. 5 is ○. FIG. 8B shows an example of a scoring result obtained by scoring for a certain scene. Scoring for the main slot and the sub-slot is performed for each image ID. That is, in this embodiment, conditions suitable for the main slot and the sub-slot are set for each scene, as shown in FIG. 8A. Image data determined to be appropriate for the slots are designated in advance. For each designated image data, the feature amounts including the number of faces, the face positions, and the face sizes are obtained. The average value and standard deviation are obtained for each feature amount.

On the other hand, if the pet priority mode is selected in step S401, in step S413, the image scoring unit 208 obtains the result of object recognition performed in step S407. For example, for each image, in step S407, if the score of the object "dog" is equal to or more than a predetermined value set in advance, the image is determined to be an image of a dog. In this case, if the score of an object (ball, grass, dogsled, or the like) associated with the dog is similarly equal to or more than a predetermined value set in advance, the score of the sub-object can be combined with the score of the dog. Note that details of step S413 will be described with reference to FIGS. 12 and 16 to 18 to be described later.

The score by the combination can be calculated using, for example, weighted addition that is performed by multiplying the score of the dog as the main object by a coefficient larger than 1 and adding the score of an object as a sub-object to the multiplication result. By this combination, an image including an associated object such as a ball together with the dog or, more particularly, an image including a plurality of objects such as a ball and a grass together with the dog has a score higher than that of an image including only the dog. For example, an image including a ball together with the dog can be estimated at a high probability as an image captured in a state in which the dog is running after the ball. Hence, the score of an image including many such objects is increased, thereby making it easy to select, as a layout target for an album, an image that shows the state of the dog in capturing.

Figure 16:
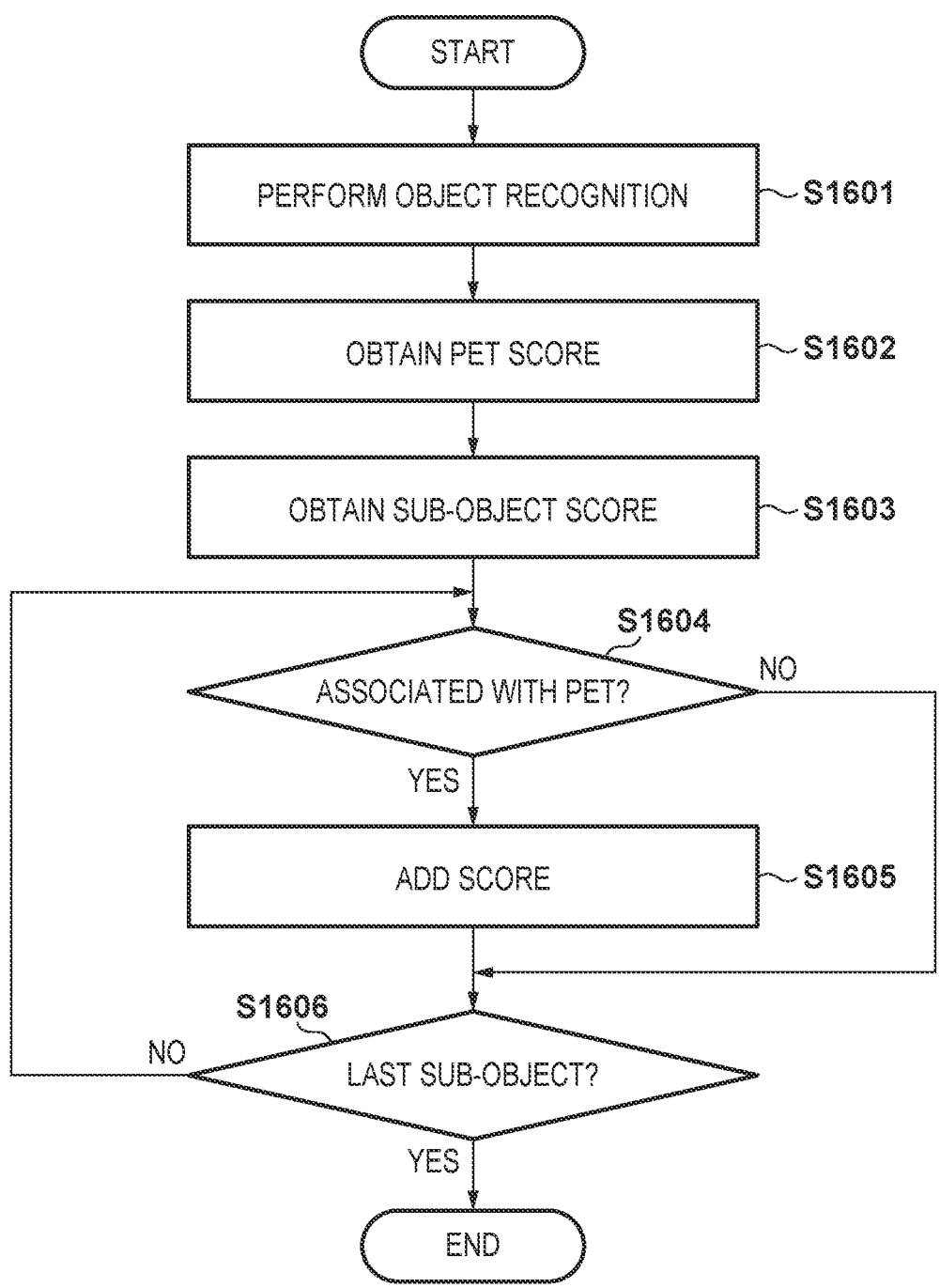
FIG. 16 is a flowchart showing an example of scoring processing in a case in which a pet priority mode is selected.
Figure 17:
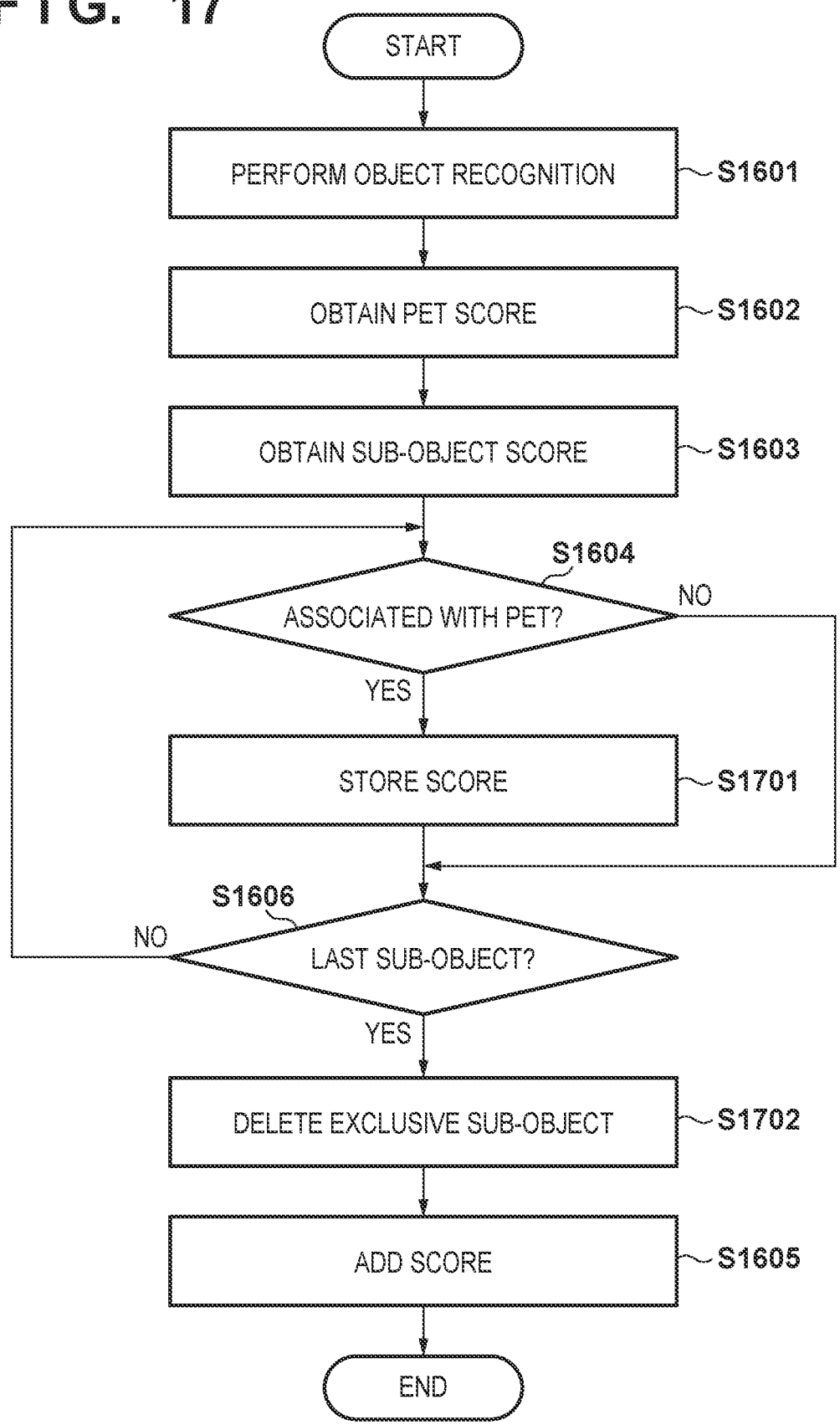
FIG. 17 is a flowchart showing another example of scoring processing in a case in which the pet priority mode is selected.
Figure 18:
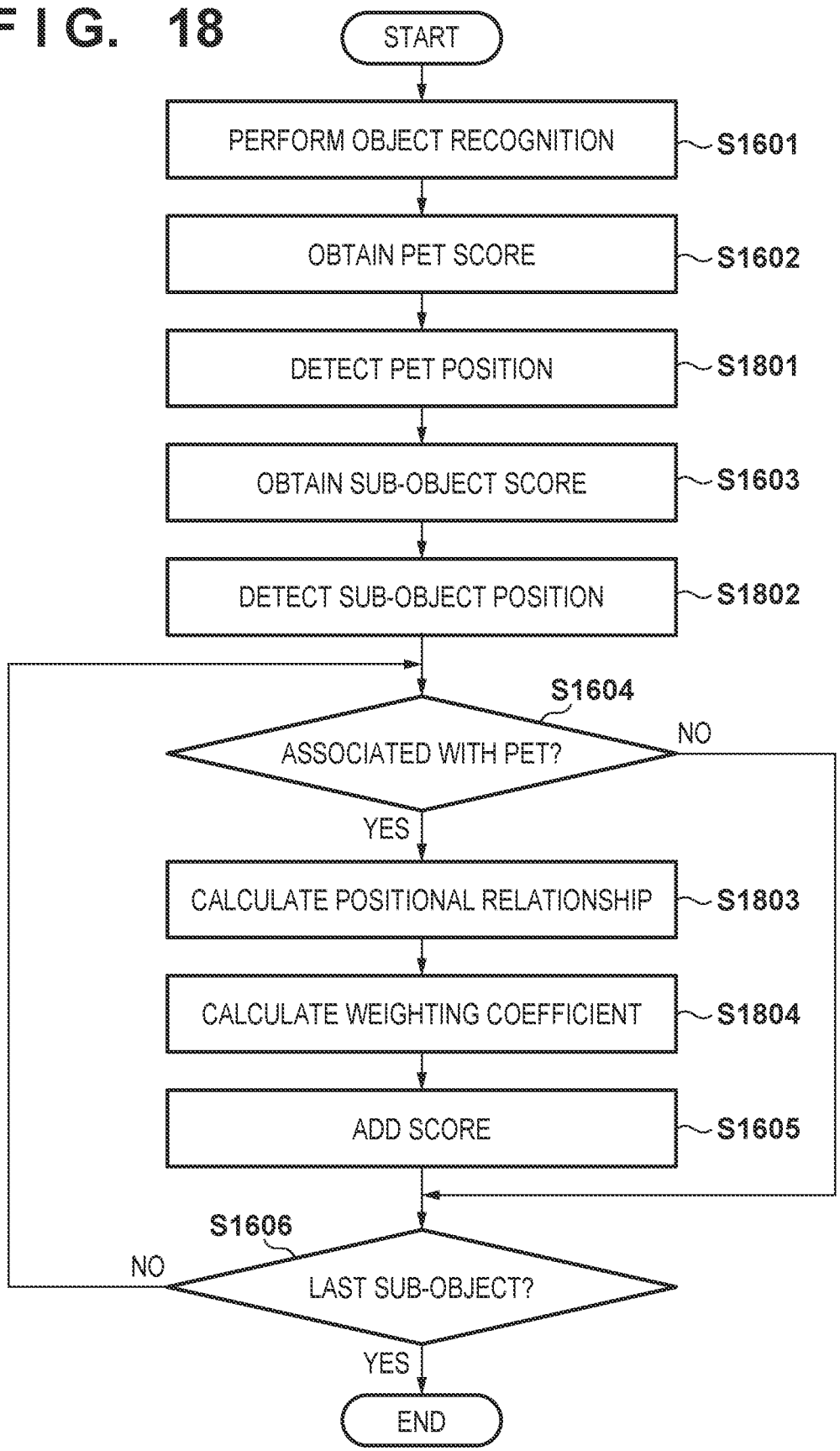
FIG. 18 is a flowchart showing still another example of scoring processing in a case in which the pet priority mode is selected.

FIG. 16 shows the processing procedure. Note that FIGS. 16 to 18 are flowcharts showing an example of the procedures of processes executed when the pet priority mode is selected. These processes are not executed when the person priority mode is set.

First, the image scoring unit 208 selects a scoring target image. The image scoring unit 208 then executes the following processing for the selected image. The image scoring unit 208 obtains the result of object recognition performed in step S407 of the processing target image (step S1601). The image scoring unit 208 obtains the score of a pet (a dog or cat in this embodiment) recognized in step S1601 (step S1602). Note that the image scoring unit 208 may separately store the scores of a dog and a cat. If the dog and the cat are not discriminated in an album, a larger value may be set as the score of a pet. In addition, the image scoring unit 208 obtains the score of an object other than the pet (step S1603). About 1,000 objects are recognized using CNN, as described above concerning step S407. The image scoring unit 208 can obtain the scores of all objects (sub-objects) other than the pet. For all the obtained sub-objects other than the pet, the image scoring unit 208 determines whether they are sub-objects (the above-described ball, grass, cushion, and the like) associated with the pet (step S1604). The image scoring unit 208 executes the determination of step S1604 based on pieces of information about the sub-objects associated with the pet, which are held in advance. If an object is determined to be a sub-object associated with the pet in step S1604 (YES in step S1604), the process advances to step S1605. If an object is not determined to be such a sub-object (NO in step S1604), the process advances to step S1606. In step S1605, the image scoring unit 208 adds the score of the sub-object determined to be associated with the pet in step S1604 to the pet score obtained in step S1602. In step S1606, the image scoring unit 208 determines whether the sub-object that has undergone the determination of step S1604 is the last sub-object, that is, whether a sub-object that has not yet undergone the determination of step S1604 exists (step S1606). Upon determining that the sub-object is not the last sub-object (NO in step S1606), the image scoring unit 208 returns the process to step S1604 again. Upon determining that the sub-object is the last sub-object (YES in step S1606), the processing ends.

The score calculation method by the combination is not limited to the above-described method by weighted addition. For example, scores can be combined using a combination condition provided for each sub-object. For example, a dogsled is mainly used in a snow accumulated state, and the probability that the dogsled and the grass are included together in one image is low. For this reason, for example, a condition that the dogsled and the grass hold an exclusive relationship is set in advance. If both the objects are recognized in one image, only a higher one of the scores of the objects may be added to the score of the dog. Additionally, for example, a dog is often put on a lead (leash or chain), but not a cat. Hence, if a dog is a main object, and a lead is recognized as an object, the image can be estimated as an image captured in a walking state. However, if a cat is a main object, and a lead is recognized, the lead is probably a determination error. Hence, in a case in which the main object is the cat, even if a lead is recognized, the score is not added. This can prevent an image that need not be preferentially selected from being preferentially selected due to the determination error. Note that weighted addition may be used to add the score, or such weighting may not be used.

FIG. 17 shows the processing procedure. Note that the processing shown in FIG. 17 is executed in place of the processing shown in FIG. 16. Points different from FIG. 16 will be described here in detail. Instead of immediately adding the score of the sub-object determined to be associated with the pet (YES in step S1604) to the score of the pet, the image scoring unit 208 temporarily stores the score (step S1701). Of the scores of sub-objects temporarily stored in step S1701, the image scoring unit 208 deletes the scores of unnecessary sub-objects that should not be added (step S1702). For example, the image scoring unit 208 compares, for example, the score of the dogsled with the score of the grass having an exclusive relationship to the dogsled, as described above. If the score of the dogsled is higher, the image scoring unit 208 deletes the score of the grass in step S1702. Note that instead of deleting the score of the grass in step S1702, the image scoring unit 208 may prohibit addition of the score of the grass in step S1605.

In step S403, the edge amount of the object can be analyzed. The edge amount may be taken into consideration when combining the score of a main object such as a dog and the score of a sub-object such as a grass. For example, if the edge amount of a dog is high (not blurred), and the edge amount of a grass is low (blurred) in an image, the image can be estimated as an image captured in a state in which the dog is running on the grass. That is, such an image probably looks dynamic. Hence, for an image in which the state during capturing can be estimated from the edge amount, weighting or score addition may be performed to increase the score. This makes it possible to select a variety of images as layout targets for an album.

Note that the state at the time of image capturing can also be estimated from the positional relationship between the main object and the sub-object. For example, if a ball exists near the mouth of a dog in an image, the image can be estimated as an image captured in a state in which the dog has the ball in the mouth. On the other hand, if the distance between the ball and the dog is long in an image, the image can be estimated as an image captured in a state in which the dog is running after the ball. At this time, for example, the user can be caused to input a key feature in album creation, and a weight can be added to a score accordingly. For example, the automatic layout processing unit 217 can display features such as "lovely" and "dynamic" as options and cause the user to select one of them. For example, if "lovely" is selected, the score is adjusted (weighted) such that the score of the image including the dog with the ball in the mouth becomes high. If "dynamic" is selected, the score is adjusted (weighted) such that the score of the image in the state in which the dog is running after the ball becomes high. In addition, for example, if a cushion exists under a dog or a cat in an image, the image can be estimated as an image captured in a state in which the dog or the cat is lying on the cushion. On the other hand, if the distance between the dog or the cat and the cushion is long, it can be determined that the cushion is not relevant to the dog or the cat. Hence, in this case, the score concerning the cushion is not added, thereby preventing an unnecessarily high score from being added for an image including an irrelevant object. Note that the score obtained here can be a score output from the CNN or a value related to it, or the output value of a normalization function such as a Softmax function.

FIG. 18 shows the processing procedure. Note that the processing shown in FIG. 18 is executed in place of the processes shown in FIGS. 16 and 17. Points different from FIG. 16 will be described here in detail. The image scoring unit 208 detects the position of the pet recognized in the image (step S1801). Many techniques are known for the position detection processing in an image. Any of the techniques can be used, and the method is not particularly limited. After step S1603, the image scoring unit 208 detects the position of a sub-object recognized in the image (step S1802). As in step S1801, any technique is usable for the position detection processing. The image scoring unit 208 calculates the relationship between the position of the pet and the position of the sub-object detected in steps S1801 and S1802 (step S1803). The image scoring unit 208 can perform the calculation using, for example, the distance between the coordinates of the specific positions of the objects such as the distance between the center coordinates of the pet and the sub-object or, if the sub-object is a ball, the distance between the coordinates of the mouth of the dog and the center coordinates of the ball. After that, the image scoring unit 208 calculates a weighting coefficient concerning the sub-object from the positional relationship between the pet and the sub-object (step S1804). Note that a correspondence table including the positional relationship between a pet and a sub-object and the weighting coefficient of the sub-object may be held in advance, and the calculation of step S1804 may be executed based on the correspondence table. Alternatively, the calculation may be performed using a predetermined function. After that, the image scoring unit 208 performs weighted addition of the score of the sub-object to the score of the main object using the calculated weighting coefficient (step S1605).

Figure 11:
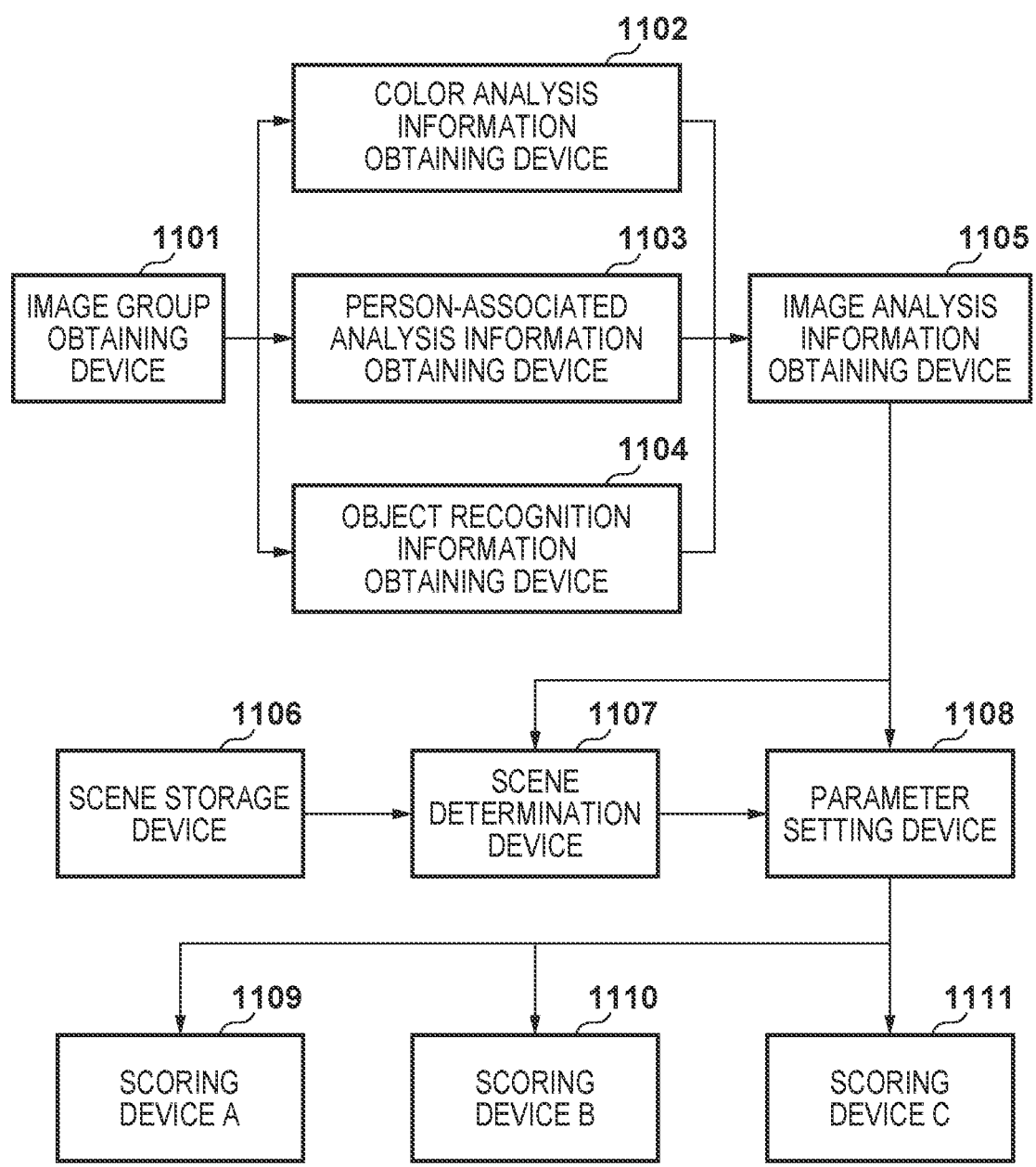
FIG. 11 is a block diagram for explaining a detailed example of the functional arrangement of an image scoring unit.

A detailed example of the functional arrangement of the image scoring unit 208 when executing the process of step S413 will be described with reference to FIG. 11. Note that each functional unit to be described later is named "device". The devices may be implemented by, for example, executing a program stored in the HDD 104 or the like by the CPU 101, and need not include individual circuits. Devices 1101 to 1111 shown in FIG. 11 can also be considered as modules included in one device. Hence, the devices 1101 to 1111 will sometimes be referred to simply as units.

The image group obtaining device 1101 obtains an image group input by the user. Note that at the time of image group obtaining, the image group obtaining device 1101 also obtains scene division information obtained by scene division by the image categorization unit 206 in step S409. The color analysis information obtaining device 1102 obtains the processing result of image feature amount obtaining processing in step S403. The color analysis information obtaining device 1102 also obtains the capturing date/time information of an image and analysis information such as the tone, edge, and focus amount of the image. The person-associated analysis information obtaining device 1103 obtains the processing result of face detection in step S404 and personal recognition in step S405. The person-associated analysis information obtaining device 1103 can also obtain the processing result of main character setting in step S412. The object recognition information obtaining device 1104 obtains the processing result of object recognition in step S407.

The image analysis information obtaining device 1105 comprehensively manages various kinds of information obtained by the color analysis information obtaining device 1102, the person-associated analysis information obtaining device 1103, and the object recognition information obtaining device 1104. All pieces of information including the feature amounts of the images are obtained. The image analysis information obtaining device 1105 can also manage secondary features that can be calculated/estimated from the color analysis information obtaining device 1102 and the person-associated analysis information obtaining device 1103. For example, the image analysis information obtaining device 1105 can manage not only the positions of faces obtained in step S404 but also the distance between the faces which can be estimated from the positions. Note that the pieces of information managed by the image analysis information obtaining device 1105 are not limited to these. For example, the image analysis information obtaining device 1105 may manage information other than the information obtained by the color analysis information obtaining device 1102, the person-associated analysis information obtaining device 1103, and the object recognition information obtaining device 1104 or secondary information based on the information. The image analysis information obtaining device 1105 may manage only some of the pieces of information obtained by the color analysis information obtaining device 1102, the person-associated analysis information obtaining device 1103, and the object recognition information obtaining device 1104.

The scene storage device 1106 stores, for each of a plurality of capturing scenes, scene categorization information to be used to determine the capturing scene of an image. In this embodiment, the scene storage device 1106 stores scene categorization information used to discriminate between three types of scenes, that is, a travel scene, a daily scene, and a ceremony scene. The scene determination device 1107 determines the capturing scene of an image based on the image analysis information managed by the image analysis information obtaining device 1105 and the scene categorization information stored in the scene storage device 1106. The scene determination device 1107 thus obtains the processing result of scene categorization in step S410 described above. In this embodiment, each image is categorized into one of the travel scene, the daily scene, and the ceremony scene by the scene determination device 1107. The parameter setting device 1108 sets a parameter used in scoring based on the capturing scene of each image decided by the scene categorization processing of the scene determination device 1107. The parameter may be, for example, a parameter decided by machine learning in advance or a parameter manually set by, for example, the user based on an engineer's empirical rule or at the time of system execution.

The parameter setting device 1108 individually gives parameters (different parameters in some cases) to the scoring device A 1109, the scoring device B 1110, and the scoring device C 1111. Each scoring device performs scoring of an image based on the parameter set from the parameter setting device 1108 and the analysis information of the image obtained by the image analysis information obtaining device 1105. In this embodiment, the scores obtained by the scoring devices A 1109 to C 1111 correspond to, for example, the score of the main slot 1002, the score of the sub-slot 1003, and the score of the sub-slot 1004, respectively. The number of scoring devices need not always be three, and may be one or two, or four or more. For example, the number of scoring axes required for album creation is arbitrary, and the necessary number of scoring axes can be set.

The image scoring unit 208 calculates the score of each image by this arrangement, thereby performing scoring according to the capturing scene of each image. At this time, the image scoring unit 208 does not uniformly set how to decide the scoring axis and parameter between the capturing scenes, thereby obtaining an image having an appropriate composition or an appropriate number of persons for each capturing scene.

Figure 12:
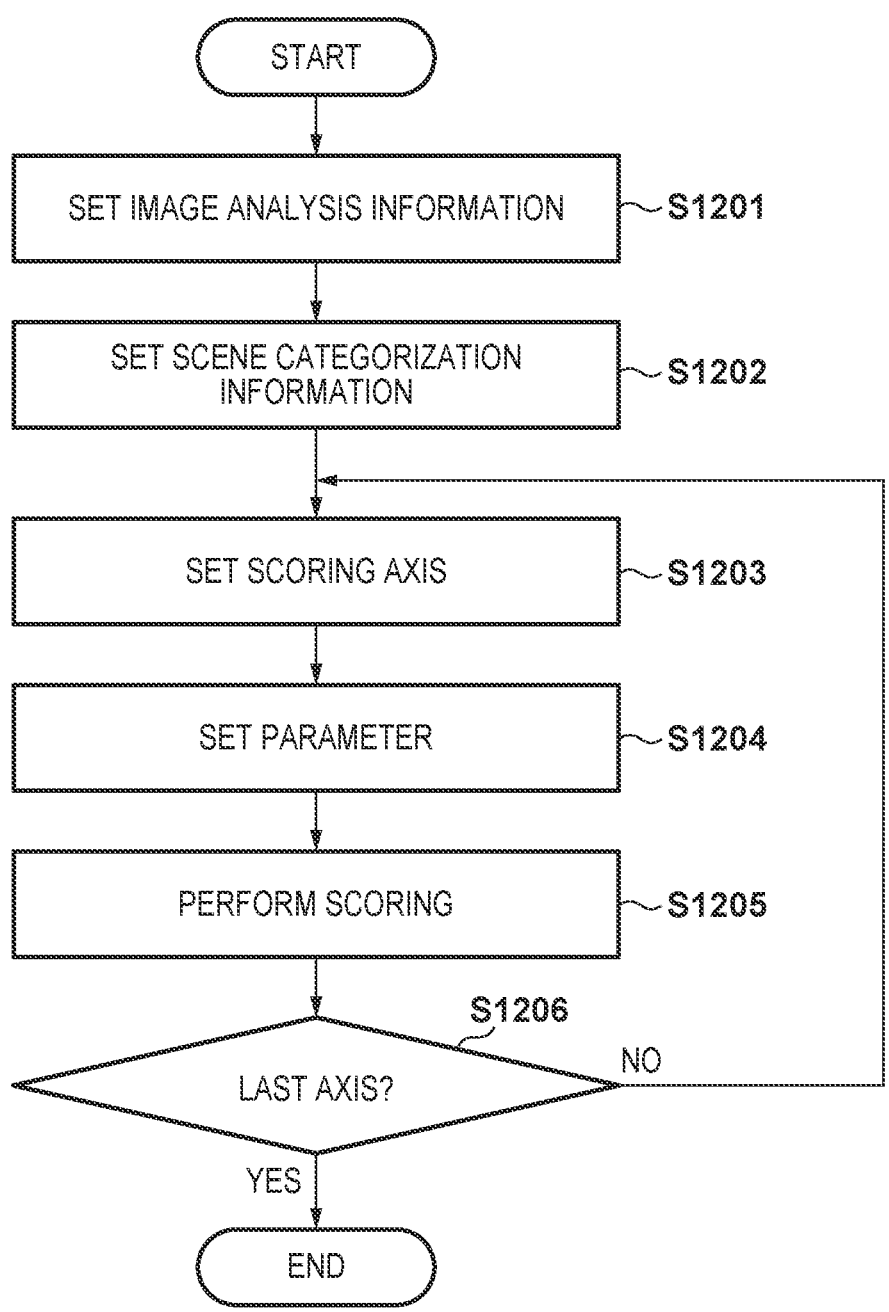
FIG. 12 is a flowchart showing an example of the procedure of image scoring processing.

Scoring processing after scene categorization will be described next with reference to FIG. 12. The image scoring unit 208 obtains image analysis information from the image analysis information obtaining device 1105 that manages the image analysis information of the color analysis information obtaining device 1102, the person-associated analysis information obtaining device 1103, and the object recognition information obtaining device 1104, and sets the image analysis information (step S1201). The image scoring unit 208 sets the capturing scene of each image categorized by the scene determination device 1107 to each image group based on the scene categorization method prepared in the scene storage device 1106 (step S1202). In this embodiment, one of the travel scene, the daily scene, and the ceremony scene is set. Then, the image scoring unit 208 sets a scoring axis (step S1203). That is, according to the example of FIG. 11, the image scoring unit 208 sets which one of the scoring devices A 1109 to C 1111 should execute scoring processing. In step S1206 to be described later, a loop is performed as many times as the number of axes. The scoring axis is set to the scoring device A 1109 in the first loop, to the scoring device B 1110 in the next loop, and to the scoring device C 1111 in the final loop. Letting i (i>0) be the capturing scene ID of an image set in step S1202, and j (j>0) be the number of a scoring axis, a scoring axis can be expressed as $e_{i,j}$.

Next, the process of step S1204 is executed. In step S1204, different processes are executed in a case in which the person priority mode is set and in a case in which the pet priority mode is set. The process in a case in which the person priority mode is set will be described first. In step S1204, the image scoring unit 208 sets a parameter required for each scoring axis in the set image capturing scene. As described above, since the parameter setting device 1108 decides a parameter corresponding to the capturing scene, the image scoring unit 208 sets the decided parameter in step S1204. For example, if the scene is categorized into a wedding scene, and the scoring axis is the scoring device A 1109, a parameter machine-learned to calculate the score of the main slot 1002 for the wedding image is set here. Every time the scene or scoring axis changes, a corresponding parameter is set. The process of step S1204 executed in a case in which the pet priority mode is set will be described next. In step S1204, the image scoring unit 208 obtains the score calculated by one of the processes shown in FIGS. 16 to 18.

Next, the process of step S1205 is executed. In step S1205 as well, different processes are executed in a case in which the person priority mode is set and in a case in which the pet priority mode is set. The process of step S1205 in a case in which the person priority mode is set will be described first. In step S1205, the image scoring unit 208 performs scoring in accordance with the set parameter. The scoring is performed, for example, in the following way. Pieces of information of thresholds and weights are associated with n parameters set in step S1204 in correspondence with the scoring axes $e_{i,j}$. Here, n thresholds and n weights corresponding to the parameters of the scoring axes $e_{i,j}$ are ensured, which are expressed as $Th(n, e_{i,j})$ and $W(n, e_{i,j})$, respectively. First, the image analysis information obtained in step S1201 is compared with the determination threshold $Th(n, e_{i,j})$. If the parameter value obtained from the analysis information exceeds the determination threshold $Th(n, e_{i,j})$, the weight $W(n, e_{i,j})$ is added to the score of the image in the scoring axis. Let $S_{i,j}$ be a value obtained by cumulative addition of the weight $W(n, e_{i,j})$ in the scoring axis. At this time, $S_{i,j}$ that is the sum for the n parameters is the final score. In this way, the cumulative addition/subtraction value of the weight W of each parameter is given to the final score in each scoring axis. Note that a parameter with a weight of 0 (a parameter that is not used) may exist depending on the scoring axis. On the other hand, a parameter to be emphasized for any capturing scene or scoring axis can commonly be used.

Next, the process of step S1205 in a case in which the pet priority mode is set will be described next. A method of calculating the score of a pet image by adding the score of the pet as a main object and the score of an object as a sub-object has been described with reference to FIGS. 16 to 18. In this embodiment, this score is used by the scoring device A. The score obtained by adding the scores of the pet and the sub-object is the score of the scoring device A, that is, the score corresponding to the main slot 1002. For this reason, the score of the scoring device A becomes high for an image including more pets and sub-objects. With this processing, an image including a pet and a sub-object, that is, an image in which the state of a pet can be estimated is readily selected as the image of the main slot 1002.

Next, the scoring device B uses, for example, the score of only the pet. With this processing, an image in which the score of the pet is high, that is, an image in which the pet is captured in a large size or faces the front is readily selected for the sub-slot 1003. Next, the scoring device C uses, for example, the score of only a sub-object. That is, the scoring device C uses the score of an object such as a ball or a cushion. With this processing, an object with which the pet usually plays can be set for the sub-slot 1004. As a result, one cut of the image of the object associated with the pet can be inserted in an album.

For the scoring device B, the same score as the scoring device A may be added. In this case, in a layout to be described later, the image of the highest score of the scoring device A is selected for the main slot 1002, and the image of the highest score of the scoring device B except the image used in the main slot 1002 is selected for the sub-slot 1003. That is, of images that include the pet and the sub-object and enable estimation of the state of the pet, the image of the highest score can be laid out in the main slot 1002, and the image of the second highest score can be laid out in the sub-slot 1003. At this time, the score of only the pet may be added to the scoring device C. If the scoring devices and the calculation methods are combined in this way, all images to be laid out in the album can be pet images.

Finally, in step S1206, it is determined whether the scoring axis is the last scoring axis. If a scoring axis that has not yet undergone the processing exists (that is, if the scoring axis is not the last scoring axis) (NO in step S1206), the process returns to step S1203. On the other hand, if the processing is ended for the last scoring axis (YES in step S1206), the processing ends. With the above-described processing, according to the example of this embodiment, the score corresponding to the main slot 1002, the score corresponding to the sub-slot 1003, and the score corresponding to the sub-slot 1004 are calculated concerning the scoring target image.

In this embodiment, concerning each image 801, a score 802 for the main slot and scores 802 for sub-slots as shown in FIG. 8B can be obtained. When the score in each scoring axis is calculated, an evaluation result representing which image is suitable for the main slot or sub-slot to what extent can be obtained. Note that since the evaluation is done based on a different criterion for each scoring axis, for example, the maximum score can change. For this reason, the scores may be normalized to compare the scores.

In this embodiment, a case in which one of the person priority mode and the pet priority mode is selected has been described. In addition, a person+pet priority mode may be provided. This is a mode to preferentially employ an image including a person and a pet together, for example, an image of a dog owner going for a walk with a dog or an image of a cat owner holding a cat for an album. In this case, the score of a person described with reference to FIG. 12 and the score of a pet described with reference to FIGS. 16 to 18 are added in step S413. Alternatively, a UI capable of designating the weight of a person or pet on the application may be provided. For example, if a setting is done to increase the number of person images and decrease the number of pet images, the score of the person is multiplied by a large weight coefficient, the score of the pet is multiplied by a small weight coefficient, and the scores are added. This enables preferential selection of an image including both the person and the pet while adjusting the balance.

Referring back to FIG. 4B, in step S414, the image scoring unit 208 determines whether the process of step S413 is ended for all image data of the image data group designated by the user. Upon determining that the process is not ended (NO in step S414), the process returns to step S413 to repeat the process of step S413. Upon determining that the process is ended (YES in step S414), the process advances to step S415.

In step S415, the double page spread assigning unit 210 determines whether the division count of the scene division in step S408 equals the double page spread count of the album input from the double page spread count input unit 209. Upon determining that the counts do not equal (NO in step S415), the process advances to step S416. Upon determining that the counts equal (YES in step S415), the process advances to step S419. For example, if the scene division count is eight, as shown in FIG. 6A, and the number input by the double page spread count input unit 209 is eight, the process advances to step S419.

In step S416, the double page spread assigning unit 210 determines whether the division count of the scene division in step S408 is smaller than the double page spread count (the number of templates used in the album) input from the double page spread count input unit 209. Upon determining that the scene division count is larger than the double page spread count (NO in step S416), the process advances to step S418. Upon determining that the scene division count is smaller than the double page spread count (YES in step S416), the process advances to step S417. If the scene division count is eight, as shown in FIG. 6A, and the number input by the double page spread count input unit 209 is 10, the process advances to step S417.

Figure 6B:
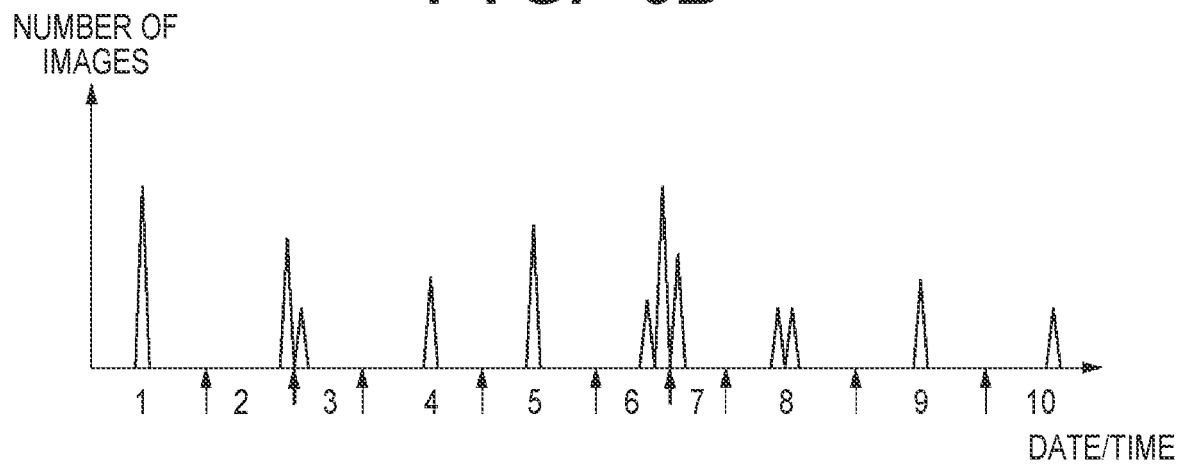

In step S417, the double page spread assigning unit 210 executes scene subdivision. The scene subdivision means subdividing a divided scene if scene division count<double page spread count of album. A case in which 10 is designated as the double page spread count of the album relative to the scene division count of 8 shown in FIG. 6A will be described. FIG. 6B shows a result of scene subdivision in FIG. 6A. In FIG. 6B, scene subdivision is performed at two points indicated by bold arrows in the state shown in FIG. 6A, thereby increasing the division count to 10.

The criterion of division will be explained. A division point where the number of images is large is searched for in the division shown in FIG. 6A. Here, to increase the division count by two from eight to 10, divided image groups of two points with many images are searched for. Note that if divided image groups include the same number of images, a divided image group in which the maximum value of the capturing date/time difference between images is larger is selected. Note that assuming a case in which a divided image group is still undecidable, one more selection criterion may be set to, for example, preferentially subdivide a divided image group corresponding to an earlier time. In FIG. 6A, divided image group 5 and then, divided image groups 1 and 2 are selected in descending order of the number of images. Divided image groups 1 and 2 include images in equal number. Since the time difference from the first image to the last image is larger in divided image group 2, divided image group 2 is selected as the scene subdivision target. Divided image groups 5 and 2 are subdivided.

Divided image group 2 has two peaks of the number of images (corresponding to, for example, different capturing dates), and therefore, is divided at a point corresponding to the portion indicated by a bold arrow in FIG. 6B. On the other hand, divided image group 5 has three peaks of the number of images (corresponding to, for example, different capturing dates). In this case, there are two points that can be division candidates where, for example, the capturing date changes. In this case, divided image group 5 is divided at a point indicated by a bold arrow in FIG. 6B such that the difference in the number of images after the division becomes small. In the scene subdivision, generally, if images of different capturing dates are included in the selected scene, division is performed to define the image data groups of the different capturing dates as new scenes. If capturing is performed across three or more days, subdivision is performed such that the difference in the number of images included in each scene is minimized, and images of the same capturing date are included in the same scene. In the above-described way, the division count is increased from eight to 10. Note that a scene is divided here at a point where the capturing date changes. However, if the point where the number of images is large is a single day, the scene may be divided at the point where the time difference in the single day is maximum. With the above procedure, the double page spread count and the number of image groups are made to match. Note that each image group generated by the division may be categorized anew, or the categorization of the image group before the division may be taken over.

Figure 6C:
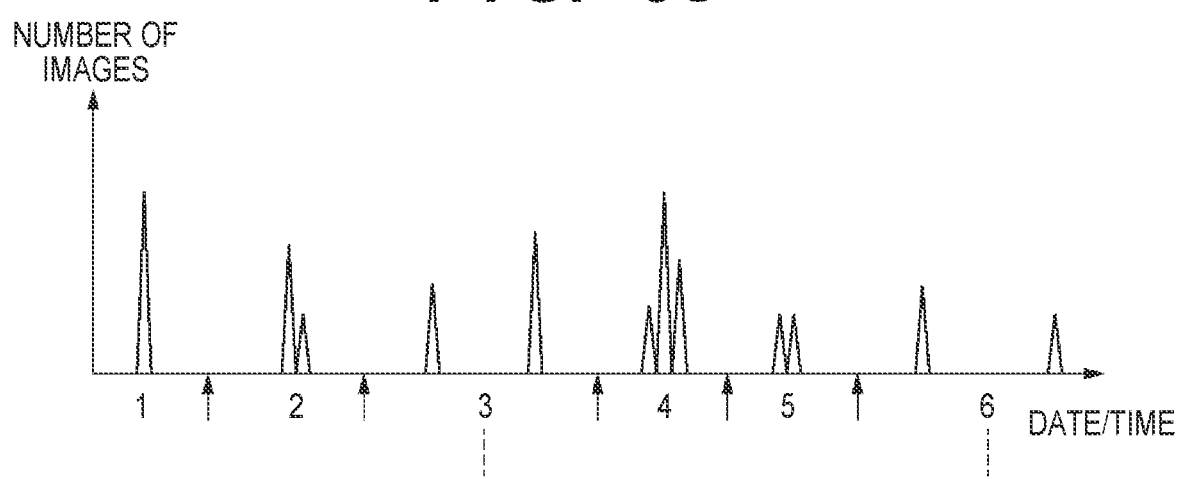

In step S418, if the number of images groups is larger than the double page spread count, the double page spread assigning unit 210 executes integration of the image groups. FIG. 6C shows a result of executing integration of image groups divided as shown in FIG. 6A. When the image groups divided at the points of broken lines are integrated, the division count changes to six.

The criterion of integration will be explained. An image group in which the number of images is small is searched for in the image groups. As for image groups including the same number of images, of the image groups, an image group whose adjacent image group(s) is not selected as an integration target is preferentially specified as an integration target. In the example of FIG. 6A, to decrease the division count by two from eight to six, two points where the number of images is small are specified. In FIG. 6A, divided image group 8 and then, divided image groups 3 and 7 are specified in ascending order of the number of images. Divided image groups 3 and 7 include images in equal number. However, since divided image group 8 adjacent to divided image group 7 is an integration target, divided image group 3 is selected as an integration target. As a result, integration is performed for each of divided image groups 3 and 8.

When integrating the divided image groups, first, it is decided whether to integrate the divided image group of the integration target with a divided image group of a preceding capturing date/time or a divided image group of a succeeding capturing date/time. In this decision, for example, of the two divided image groups adjacent to the divided image group of the integration target, a divided image group with a smaller time difference in the capturing date/time is specified as the counterpart of integration. In FIG. 6A, since divided image group 3 is decided as the integration target, as described above, one of adjacent divided image groups 2 and 4 is selected as the counterpart of integration. In FIG. 6A, the time differences between divided image group 3 and preceding and succeeding divided image groups 2 and 4 are compared. The time difference between divided image group 3 and divided image group 4 is smaller than the time difference between divided image group 3 and divided image group 2. For this reason, divided image group 3 is integrated with divided image group 4. In this way, integration is performed at the point indicated by the broken line in FIG. 6C. On the other hand, divided image group 8 is adjacent to only one divided image group and is therefore integrated with the only one adjacent divided image group (divided image group 7) at the point indicated by the broken line in FIG. 6C. Note that the integration includes, for example, updating information representing image files included in the divided image groups in accordance with the divided image groups after the integration.

In step S419, the double page spread assigning unit 210 executes double page spread assignment. At this point of time, the scene division count matches the double page spread count because of steps S415 to S418. Hence, the double page spread assigning unit 210 assigns the image groups from the top sequentially to the double page spreads in the order of capturing date/time.

In step S420, the image selection unit 211 executes selection of one or more images. An example in which four image data are selected from a divided image group assigned to a certain double page spread will be described below with reference to FIGS. 9A to 9I.

Figure 9A:
FIGS. 9A to 9I are views for explaining selection of image data.
Figure 9B:

The section from the start to the end shown in FIG. 9A represents the time difference (divisional capturing period) from the capturing date/time of the first image data to the capturing date/time of the last image data in the divided image group assigned to the double page spread. A method of selecting the first image will be described with reference to FIG. 9B. The template includes one main slot 1002, as shown in FIGS. 10A to 10Q. Hence, image data for the main slot is selected as the first image data. Of a plurality of image data corresponding to the capturing period of the image group shown in FIG. 9B, image data whose score for the main slot given in step S413 is highest is selected. The capturing date/time of the selected image data is indicated by "1" in FIG. 9B.

Figure 9C:
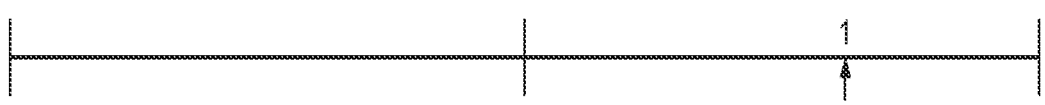
Figure 9D:
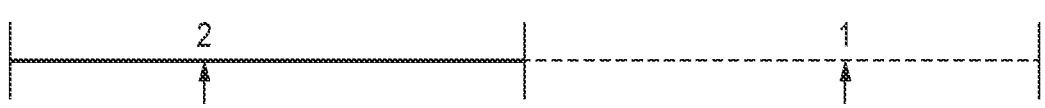

From the second image, image data for a sub-slot is selected. In this embodiment, image selection is performed so the capturing dates/times of selected image data do not concentrate to one portion of the capturing period of the divided image group. A method of subdividing the capturing period of the divided image group in this embodiment will be described below. First, as shown in FIG. 9C, the capturing period of the image group is divided into two parts. Next, as shown in FIG. 9D, second image data is selected from image data corresponding to the capturing period indicated by the solid line in which the first image data is not selected. For example, of a plurality of image data corresponding to the capturing period of the solid line in FIG. 9D, image data whose score for the sub-slot is highest is selected.

Figure 9E:
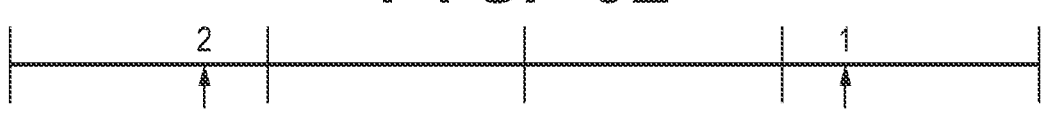
Figure 9F:
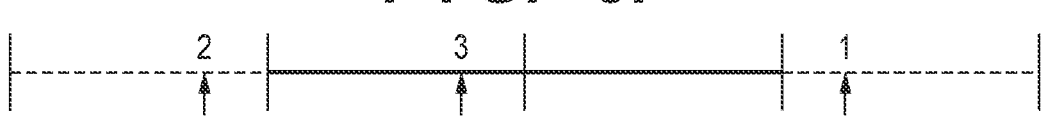

Next, as shown in FIG. 9E, each of the two capturing periods divided in FIG. 9D is further divided into two parts. Then, as shown in FIG. 9F, of a plurality of image data corresponding to the capturing periods of the solid lines in which the first and second image data are not selected, for example, image data whose score for the sub-slot is highest is selected as the third image data.

Figure 9G:
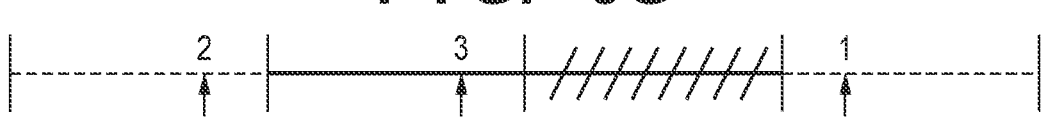
Figure 9H:
Figure 9I:

Concerning a case in which no image data exists in the capturing period of the image data selection target, and image data cannot be selected, selection of fourth image data will be described as an example. FIG. 9G shows a state in which when selecting the fourth image data from the hatched capturing period where no image data is selected yet, no image data exists in the hatched capturing period. In this case, as shown in FIG. 9H, each of the divided capturing periods is further divided into two parts. Next, as shown in FIG. 9I, of a plurality of image data corresponding to the capturing periods of the solid lines in which the first to third image data are not selected, for example, image data whose score for the sub-slot is highest is selected as the fourth image data. When the capturing times of the images to be arranged in the main slot and the sub-slots are distributed in this way, monotony of an album can be eliminated.

In addition, based on the result of estimating the state of a pet in step S413, control may be done to select a variety of images. For example, assume that there are 10 images each including a dog running on a grass and having a relatively high score, and 10 images each including a dog drawing a dogsled in a snowfield and having a relatively low score. In this case, if five images are selected based on the scores, all the five selected images are the images of the dog running on the grass, and a monotonous album including similar images may be created. Hence, to select a variety of images of various states, for example, an upper limit may be set for the number of images of each state. That is, when the upper limit of the number of images with the dog running on the grass is set to three, three images with the dog running on the grass are selected, and accordingly, from the fourth image, two images are selected from the images of the dog drawing the dogsled in the snowfield. This can prevent only similar images from being selected.

Referring back to FIG. 4B, in step S421, the image layout unit 213 decides an image layout. The image layout unit 213 selects, from candidates that are templates input by the template input unit 212, a template in which the position of the main slot corresponds to the time-series position of a selected main slot image of a scene of interest. In this embodiment, image data of an earlier capturing date/time is laid out on the upper left side of the template, and image data of a later capturing date/time is laid out on the lower right side. On the other hand, it is cumbersome to individually associate the position of each slot with an image. Hence, for example, the templates can be divided into groups in accordance with the positions of the main slot and sub-slots, and further divided into groups in accordance with image orientations (portrait and landscape). The templates are narrowed down in accordance with the time-series position and orientation of a main slot image. The templates that are narrowed down are similarly narrowed down in association with the sub-slots as well. In this way, the template input unit 212 can narrow down the template candidates and decide the template to be finally employed.

An example in which the template input unit 212 uses the templates shown in FIGS. 10A to 10P as template candidates for a certain double page spread in accordance with designated template information will be described here. The number of slots in each input template is three, as show in FIGS. 10A to 10P. Concerning whether the image orientation is portrait or landscape, three selected image data 1005 to 1007 are arranged in the order of capturing date/time as shown in FIG. 10Q. The image data 1005 is image data for the main slot, and the image data 1006 and 1007 are image data for the sub-slots. The main slot image 1005 has the latest capturing date/time, as shown in FIG. 10Q. Hence, the templates are narrowed down to the candidates shown in FIGS. 10I to 10P each including the main slot arranged on the right side. Of these templates, the templates shown in FIGS. 10I to 10L are selected as candidates because the image data 1005 for the main slot is portrait. Since the old image 1006 for the sub-slot is portrait, and the new image 1007 is landscape, the template shown in FIG. 10J is selected as a template optimum for the selected image. In the above-described way, a specific slot of a specific template in which the image selected in step S420 should be laid out is decided in step S421.

Figure 13:
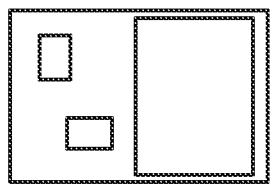
FIG. 13 is a view showing an example of another template used for layout of image data.

Note that at this time, there can exist a template in which the number, orientations, and positions of slots match those in the template shown in FIG. 10J, and the size of the main slot is larger than in FIG. 10J, as shown in FIG. 13. As described above, if a plurality of template candidates that match the orientations and the order of the capturing dates/times of images exist, the template can be selected based on the difference between the scores decided for the images in step S413. For example, if the score of the main slot image is higher than a value obtained by adding a predetermined threshold to the average score for the plurality of sub-slots, the template including the main slot with the large size shown in FIG. 13 is selected. Otherwise, the template shown in FIG. 10J can be selected. Note that, for example, if the score of the main slot image is higher than a predetermined value, the template shown in FIG. 13 may be selected (regardless of the scores of the sub-slot images). In addition, if the score of the sub-slot image is higher than a predetermined value, the template shown in FIG. 10J may be selected (regardless of the scores of the main slot images). Furthermore, if both the score of the main slot image and the scores of the sub-slot images are higher than predetermined values, respectively, the template may be selected based on the score difference, as described above. Information capable of identifying which image should be laid out in a specific slot of a specific template is decided in this way.

Figure 14A:
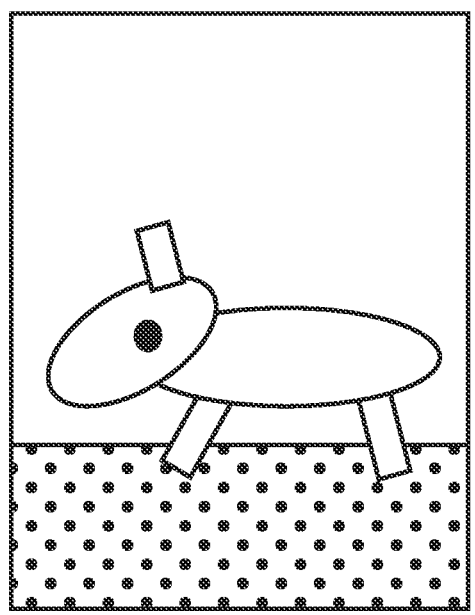
FIGS. 14A to 14D are views for explaining an example in which an image is trimmed and arranged.
Figure 14B:
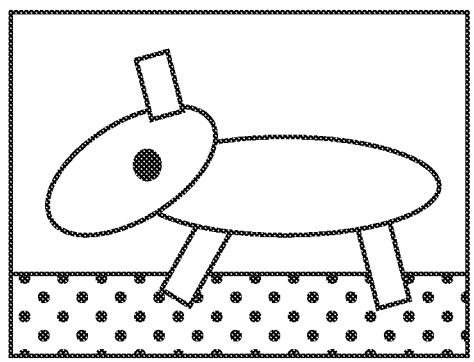
Figure 14C:
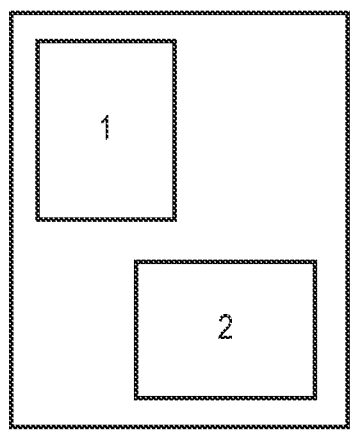
Figure 14D:
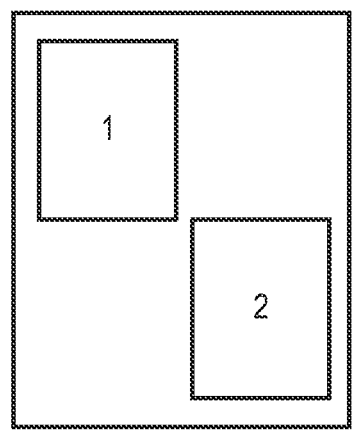

In addition, based on the result of estimating the state of the pet in step S413, the template to be selected to the slot to lay out an image may be changed. For example, in a case of an image of a running dog, generally, the dog often moves in the vertical direction in the image. For this reason, even if an image estimated to be an image of a running dog is a portrait image, a layout more adaptive to the movement of the object can be obtained by setting the image in a slot after it is transformed by, for example, trimming in the horizontal direction. The layout processing will be described with reference to FIGS. 14A to 14D. FIG. 14A shows a portrait image. Assume that a dog and a grass are recognized in this image by object recognition, and as a result, the image is estimated to be an image of a running dog. At this time, instead of laying out the image shown in FIG. 14A in an album directly as a portrait image, the image is preferably trimmed into a landscape image and then laid out. This can delete extra regions on the upper and lower sides of the image and show the object large in the slot. For this reason, an image as shown in FIG. 14B can be formed by trimming the image shown in FIG. 14A in the horizontal direction and set in a landscape slot of a template. A template shown in FIG. 14C is a template including one portrait template and one landscape template. Since a portrait image is normally laid out a portrait slot of a template, the image shown in FIG. 14A is laid out in a slot "1". However, when the image shown in FIG. 14B is generated by trimming in the horizontal direction, the image is laid out in a slot "2". Additionally, even if a template shown in FIG. 14D is selected in advance, a template including a landscape slot as shown in FIG. 14C can be reselected if the image of the running dog is estimated as a layout target as the result of object recognition. In the reselected template, the image of the running dog can be laid out in, for example, the slot "2" shown in FIG. 14C.

In step S422, the image correction unit 215 executes image correction. If an image correction ON is input from the correction condition input unit 214, the image correction unit 215 automatically executes image correction. As the image correction, for example, brightness correction, red-eye correction, or contrast correction is executed. If an image correction OFF is input from the correction condition input unit 214, the image correction unit 215 does not execute image correction. The image correction can be executed for, for example, image data converted into an image having a size of 1,200 pixels along the short side on an sRGB color space.

In step S423, the layout information output unit 216 creates layout information. The image layout unit 213 lays out image data (that has undergone the image correction executed in step S422) in each slot of the template decided in step S421. At this time, the image layout unit 213 scales each image data to be laid out in accordance with the size information of the slot and lays out the image data. The layout information output unit 216 generates bitmap data in which the image data are laid out in the template.

In step S424, it is determined whether the processes of steps S420 to S423 are ended for all double page spreads. Upon determining that the processes are not ended (NO in step S424), the processing is repeated from step S420. Upon determining that the processes are ended (YES in step S424), the automatic layout processing in FIGS. 4A and 4B ends.

Note that pet state estimation may be performed by combining the pet recognized in step S407 and the person detected in steps S403 to S405. Here, the main object is the pet, and the sub-object is the person.

As described above, in steps S403 to S405, the image analysis unit 205 performs face detection and personal recognition in the image. The image scoring unit 208 obtains the scores of the image in step S413. If the pet mode is selected in step S401, pet recognition of a dog or a cat is performed in step S407. The image scoring unit 208 obtains the scores of the image in step S413. Assume that, for example, two recognized persons (a person A and a person B) exist, and a dog is recognized as a pet. If the dog is included together with the person B rather than the person A, the person B is determined as the owner of the dog. At this time, for the person determined as the owner, information representing that the person is the owner of the dog is added to the personal ID registered in the face dictionary database in step S405. When selecting images to be employed in an album, a weight is added such that the score of an image including the dog as the main object together with the person determined as the owner becomes high, thereby selecting many images of the pet included together with the owner.

Figure 15A:
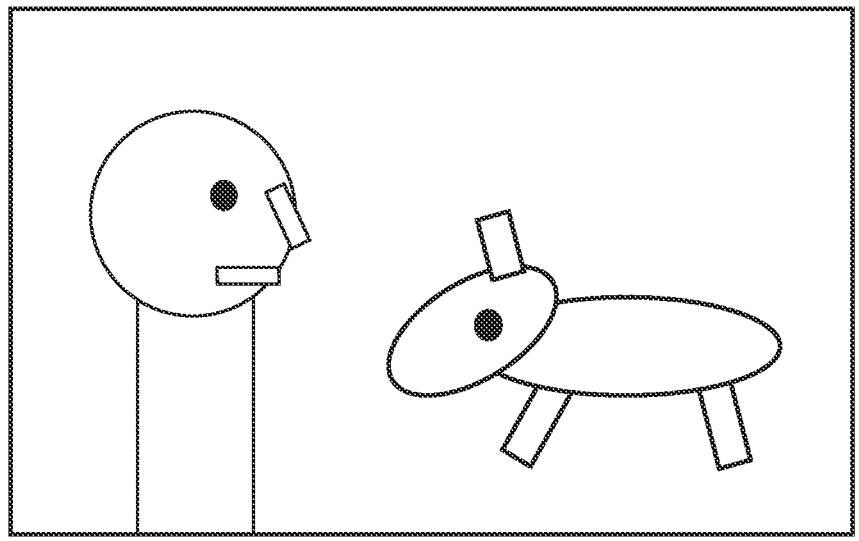
FIGS. 15A and 15B are views for explaining the relationship between a main object and a sub-object.
Figure 15B:
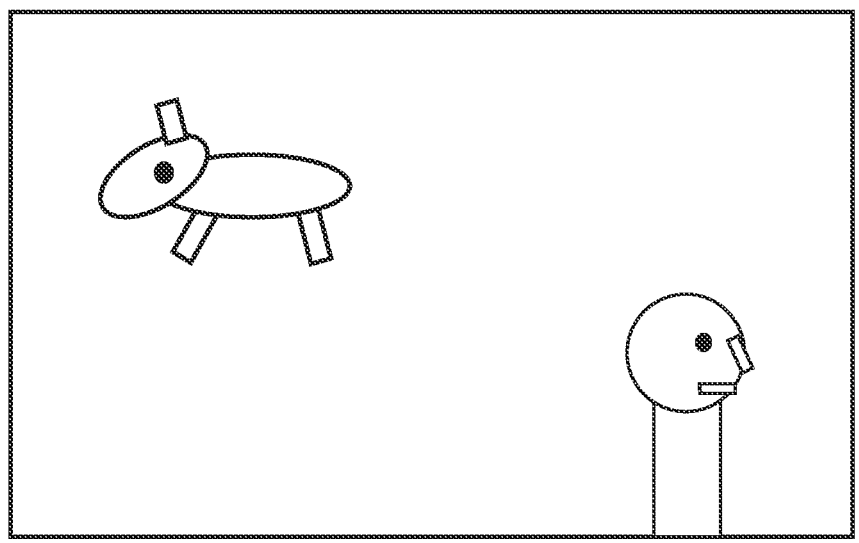

The scores may be weighted based on the recognized positions of the dog and the person. For example, if the distance between the face of the dog and the face of the person is short in an image, the image can be estimated as an image captured in a state in which the dog is playing with the person. On the other hand, if the faces are spaced apart in the image, the image can be estimated as an image captured in a state in which the dog is not associated with the person. FIG. 15A shows an example of an image in which the distance between the dog as the main object and the person as the sub-object is short. This image is estimated as an image captured in a state in which the dog is playing with the person. FIG. 15B shows an example of an image in which the distance between the dog as the main object and the person as the sub-object is long. This image is estimated as an image captured in a state in which the dog is not playing with (not associated with) the person. Accordingly, the scores are weighted in accordance with the distance between the dog and the person such that the weight is increased to obtain a high score as the distance becomes short or the weight is decreased to obtain a low score as the distance becomes long. If the direction of the face of the dog or the direction of the face of the person can be detected, the scores may be weighted using the directions. That is, an image in which the dog and the person face each other, as shown in FIG. 15A, is estimated as an image captured in a state in which the dog is playing with the person. An image in which the dog and the person do not face each other, as shown in FIG. 15B, is estimated as an image captured in a state in which the dog is not playing with the person. When the scores are weighted based on the estimation, more images of the dog playing with the person can be selected.

On the other hand, not only the person but also an object such as the above-described ball may be used another sub-object. For example, if the dog that is the main object and the person and the ball that are the sub-objects are recognized in an image, the image can be estimated as an image captured in a state in which, for example, the person is playing with the dog by tossing the ball. Even if the distance between the dog and the person is long in the image, if a lead (leash or chain) is detected between the dog and the person, the image can be estimated as an image captured in a state in which, for example, the person is going for a walk with the dog. Hence, when a predetermined object that associates the person with the dog is detected in the image, weighting is performed such that the score of the image becomes high, and the image is readily selected as an image to be used in an album.

As described above, pet state estimation can be performed using the pet recognized in step S407 as the main object and the person detected in steps S403 to S405 as the sub-object. At this time, scoring of the image is performed based on the criteria, for example, which person is detected, how short the distance from the pet is, and whether combination with the object recognized in step S407 is possible. A variety of pet state estimation can thus be performed.

Note that in the above description, a pet such as a dog or a cat has been explained as the main object. However, the main object is not limited to a pet, and can be an animal in a zoo or fish in an aquarium. For example, if a panda is selected as the main object, a bamboo is set in advance as a sub-object. An image including them can be estimated as an image captured in a state in which the panda is eating the bamboo. When the score of the image is increased, the image is selected for use in an album more readily than an image simply including only the panda. Note that for this purpose, a zoo or aquarium mode may be added to the priority mode selection button 310.

Not an animal but a moving object such as a railway vehicle may be set to the main object. At this time, for example, a railway bridge, a valley, a station building, and the like are designated in advance as sub-objects. Accordingly, it is possible to make the score of an image including a sub-object higher than the score of an image including the main object solely and create an album including a variety of images, as in the above-described case.

According to this method, scoring of each image is performed in accordance with image analysis information. At this time, the score of a sub-object associated with a main object is obtained, the state of the main object is estimated, and weighted addition of the score of the image is performed in accordance with the state, thereby selecting images of the main object in various situations. It is therefore possible to generate an album including a variety of images and attracting interest of the user.

Note that processing in a case in which the album creation application is used has been described above. The above-described processing is applicable to image evaluation processing for selecting/displaying an appropriate image from captured scenes in an image group.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-239782, filed Dec. 9, 2016, which is hereby incorporated by reference herein in its entirety.

What is claimed is:

1. An image processing apparatus comprising:
an obtaining unit configured to obtain an image;
an acceptance unit configured to accept a designation of a predetermined mode by a user operation;
a determination unit configured to determine whether or not a first object and a second object associated with the first object are included in the obtained image in a case where the designation of the predetermined mode is accepted;
a selection unit configured to perform, in a case where it is determined that the first object and the second object are included in the obtained image, selection of an image such that an image including the first object and the second object is selected more preferentially than an image that includes the first object but does not include the second object; and
a layout unit configured to lay out the selected image,
wherein the obtaining unit, the acceptance unit, the determination unit, the selection unit, and the layout unit are implemented by at least one processor of the image processing apparatus.

2. The apparatus according to claim 1, wherein, in a case where it is determined in the determination unit that the second object is included in the obtained image, the selection unit (a) determines a score for the obtained image based on the first object and the second object, and (b) selects an image based on the score.

3. The apparatus according to claim 2, wherein, in a case where it is determined in the determination unit that the second object is included in the obtained image, the selection unit determines the score based on a positional relationship in the obtained image between the first object and the second object.

4. The apparatus according to claim 2, wherein, in a case where it is determined in the determination unit that the second object is included in the obtained image, the selection unit determines the score based on an edge amount detected in each of the first object and the second object.

5. The apparatus according to claim 4, wherein the score for an image with a higher edge amount for the first object and a lower edge amount for the second object is increased.

6. The apparatus according to claim 2, wherein, in a case where it is determined in the determination unit that the second object is included in the obtained image, the selection unit determines the score based on a direction of each of the first object and the second object.

7. The apparatus according to claim 6, wherein the selection unit determines the score such that an image, in which a direction of a face of the first object and a direction of a face of the second object face each other, is preferentially selected.

8. The apparatus according to claim 1, further comprising an output unit configured to output an area for printing in which the selected image is laid out, wherein the output unit is implemented by the at least one processor of the image processing apparatus.

9. The apparatus according to claim 1, wherein the selected image is assigned to a double page spread area in an album.

10. The apparatus according to claim 1, wherein the predetermined mode is a pet priority mode.

11. A method comprising:
obtaining an image;
accepting a designation of a predetermined mode by a user operation;
determining whether a first object and a second object associated with the first object are included in the obtained image in a case where the designation of the predetermined mode is accepted;
performing, in a case where it is determined that the first object and the second object are included in the obtained image, selection of an image such that an image including the first object and the second object is selected more preferentially than an image that includes the first object but does not include the second object; and
laying out the selected image.

12. The method according to claim 11, wherein, in a case where it is determined that the second object is included in the obtained image, (a) a score for the obtained image is determined based on an edge amount detected in each of the first object and the second object, and (b) an image is selected based on the score, and
wherein the score for an image with a higher edge amount for the first object and a lower edge amount for the second object is increased.

13. The method according to claim 11, wherein, in a case where it is determined that the second object is included in the obtained image, (a) a score for the obtained image is determined based on a direction of each of the first object and the second object, and (b) an image is selected based on the score, and
wherein the score is determined such that an image, in which a direction of a face of the first object and a direction of a face of the second object face each other, is preferentially selected.

14. The method according to claim 11, wherein the selected image is assigned to a double page spread area in an album.

15. The method according to claim 11, wherein the predetermined mode is a pet priority mode.

* * * * *